US009003725B2

(12) United States Patent
Digmann et al.

(10) Patent No.: US 9,003,725 B2
(45) Date of Patent: Apr. 14, 2015

(54) WEATHER BARRIER APPARATUSES FOR SEALING OR SHELTERING VEHICLES AT LOADING DOCKS

(71) Applicants: Charles Digmann, Dubuque, IA (US); David J. Hoffmann, Peosta, IA (US); Gary Borgerding, Dubuque, IA (US)

(72) Inventors: Charles Digmann, Dubuque, IA (US); David J. Hoffmann, Peosta, IA (US); Gary Borgerding, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 14/483,956

(22) Filed: Sep. 11, 2014

(65) Prior Publication Data
US 2015/0007513 A1  Jan. 8, 2015

Related U.S. Application Data

(63) Continuation-in-part of application No. 13/933,848, filed on Jul. 2, 2013.

(51) Int. Cl.
*E04D 13/18* (2014.01)
*E04H 14/00* (2006.01)
*B65G 69/00* (2006.01)

(52) U.S. Cl.
CPC .............. *B65G 69/008* (2013.01); *E04H 14/00* (2013.01); *B65G 69/001* (2013.01)

(58) Field of Classification Search
CPC ..... B65G 69/00; B65G 69/003; B65G 69/008
USPC ............................. 52/173.1, 173.2, 2.11, 2.12
See application file for complete search history.

(56) References Cited

U.S. PATENT DOCUMENTS

| 3,322,132 | A | | 5/1967 | Rieder et al. |
| 3,403,489 | A | | 10/1968 | Frommelt et al. |
| 3,638,667 | A | | 2/1972 | Frommelt et al. |
| 3,792,559 | A | * | 2/1974 | Frommelt et al. ........... 52/173.2 |

(Continued)

FOREIGN PATENT DOCUMENTS

| WO | WO 02064908 A1 * | 8/2002 |
| WO | 2013023136 | 2/2013 |

OTHER PUBLICATIONS

Frommelt, "Weather-Guard Dock Shelters Model 402," published May 2001, 2 pages.

(Continued)

*Primary Examiner* — Mark Wendell
*Assistant Examiner* — Keith Minter
(74) *Attorney, Agent, or Firm* — Hanley, Flight & Zimmerman, LLC

(57) ABSTRACT

Example weather barrier apparatuses for sealing or sheltering vehicles at loading docks are disclosed herein. An example apparatus includes a first seal to be engaged by a vehicle as the vehicle moves between a departed position and a parked position relative to the first seal. The first seal has a penetration portion movable between a relaxed condition when the vehicle releases the first seal and an activated condition when the vehicle engages the first seal. A second seal is coupled adjacent the first seal. The second seal has an opening to be positioned adjacent the penetration portion of the first seal such that at least a portion of the penetration portion extends across at least a portion of the opening when the first seal is in the relaxed condition, and the opening of the second seal receives at least the penetration portion of the first seal when the first seal is in the activated condition.

18 Claims, 30 Drawing Sheets

(56) References Cited

U.S. PATENT DOCUMENTS

| | | | |
|---|---|---|---|
| RE28,391 E | | 4/1975 | Frommelt et al. |
| 3,875,954 A | | 4/1975 | Frommelt et al. |
| 4,213,279 A | * | 7/1980 | Layne .................. 52/173.2 |
| 4,365,452 A | * | 12/1982 | Fillman et al. ........... 52/173.2 |
| 4,381,631 A | | 5/1983 | Frommelt |
| 4,554,768 A | | 11/1985 | Srajer |
| 4,638,612 A | | 1/1987 | Bennett |
| 4,711,059 A | | 12/1987 | Layne |
| 4,799,342 A | | 1/1989 | Klevnjans |
| 4,805,362 A | | 2/1989 | Frommelt et al. |
| 4,825,607 A | | 5/1989 | Frommelt et al. |
| 4,873,800 A | | 10/1989 | Frommelt et al. |
| 5,125,196 A | | 6/1992 | Moody |
| 5,174,075 A | * | 12/1992 | Alten .................. 52/173.2 |
| 5,174,084 A | | 12/1992 | Alten |
| 5,185,977 A | | 2/1993 | Brockman et al. |
| 5,282,342 A | | 2/1994 | Brockman et al. |
| 5,341,613 A | | 8/1994 | Brockman et al. |
| 5,394,662 A | | 3/1995 | Giuliani et al. |
| 5,553,424 A | | 9/1996 | Brockman et al. |
| 5,622,016 A | * | 4/1997 | Frommelt et al. ......... 52/173.2 |
| 5,775,044 A | * | 7/1998 | Styba et al. ........... 52/173.2 |
| 5,953,868 A | | 9/1999 | Giuliani et al. |
| 6,205,721 B1 | | 3/2001 | Ashelin et al. |
| 6,233,885 B1 | | 5/2001 | Hoffmann et al. |
| 6,425,214 B1 | | 7/2002 | Boffeli et al. |
| 6,854,224 B2 | * | 2/2005 | Thill et al. ............ 52/173.2 |
| 7,185,463 B2 | | 3/2007 | Borgerding |
| 7,882,663 B2 | * | 2/2011 | Borgerding .......... 52/173.2 |
| 8,307,588 B2 | | 11/2012 | Hoffmann et al. |
| 8,458,960 B2 | * | 6/2013 | Digmann et al. ........ 52/2.12 |
| 2004/0261335 A1 | | 12/2004 | Eungard |
| 2006/0026912 A1 | | 2/2006 | Eungard et al. |
| 2006/0032159 A1 | | 2/2006 | Eungard et al. |
| 2006/0272222 A1 | * | 12/2006 | Hoffmann et al. ........ 52/2.12 |
| 2007/0283636 A1 | | 12/2007 | Bernacki et al. |
| 2015/0007511 A1 | | 1/2015 | Digmann et al. |
| 2015/0007512 A1 | | 1/2015 | Digmann et al. |

OTHER PUBLICATIONS

Frommelt, "Rain Diverter Curtain," published Jul. 1, 1992, 1 page.
International Searching Authority, "The Written Opinion of the International Searching Authority," issued in connection with corresponding International Patent Application No. PCT/US2014/044087, mailed Oct. 28, 2014 (7 pages).
International Searching Authority, "The International Search Report," issued in connection with corresponding International Patent Application No. PCT/US2014/044087, mailed Oct. 28, 2014 (6 pages).
The United States Patent and Trademark Office, "Notice of Allowance," issued in connection with U.S. Appl. No. 13/933,848, on Dec. 1, 2014 (68 pages).
The United States Patent and Trademark Office, "Notice of Allowance," issued in connection with U.S. Appl. No. 14/483,929, on Dec. 1, 2014 (52 pages).
The United States Patent and Trademark Office, "Supplemental Notice of Allowance," issued in connection with U.S. Appl. No. 13/933,848, on Jan. 14, 2015 (8 pages).
The United States Patent and Trademark Office, "Supplemental Notice of Allowance," issued in connection with U.S. Appl. No. 14/483,929, on Dec. 31, 2014 (9 pages).

* cited by examiner

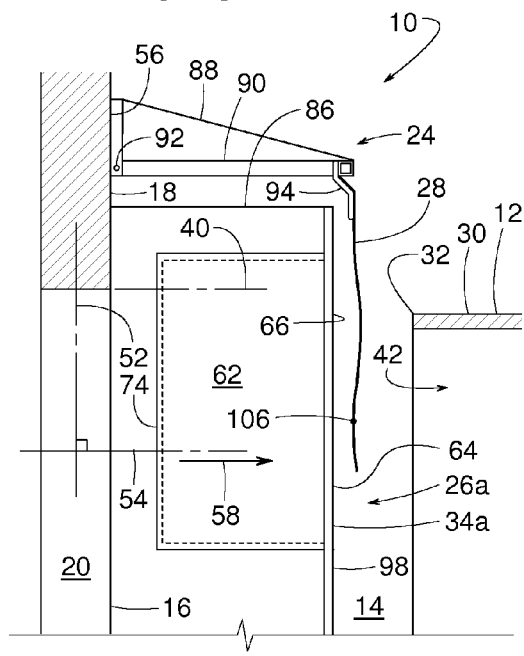

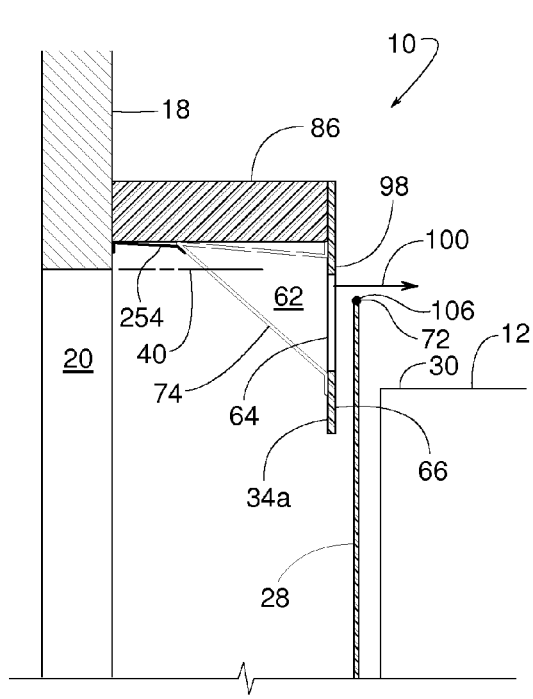
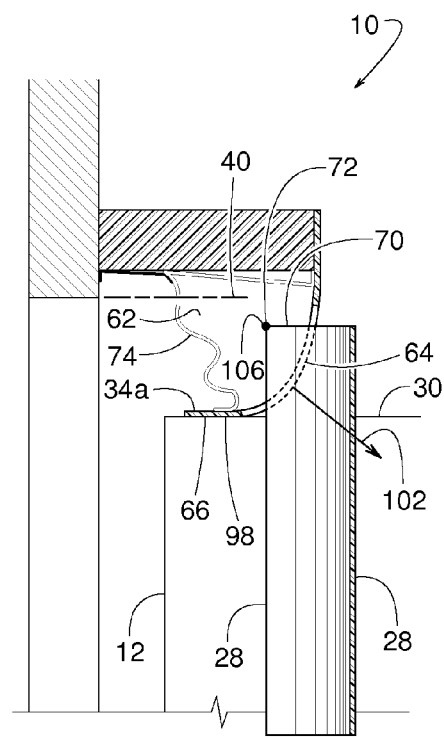

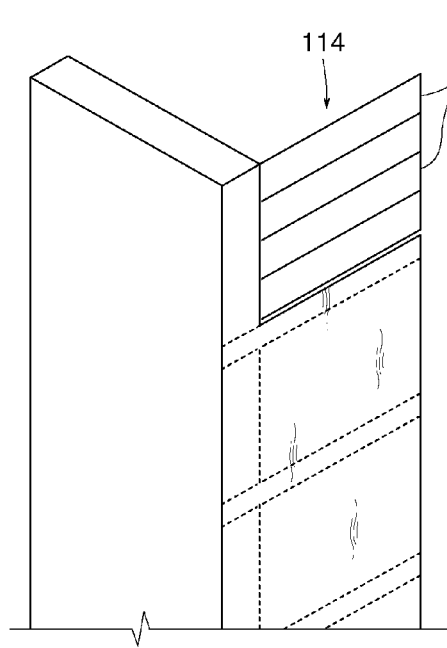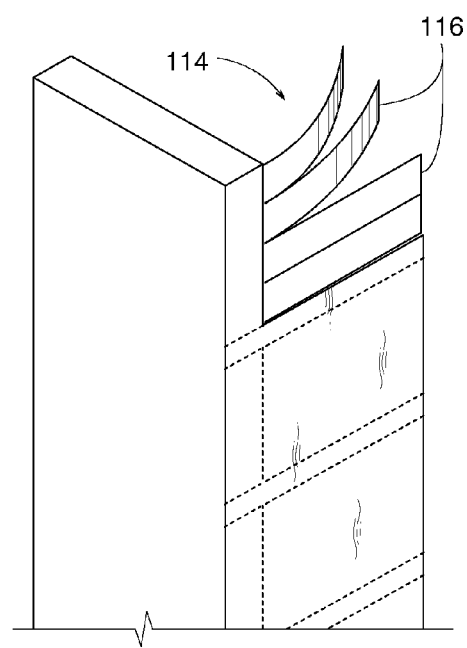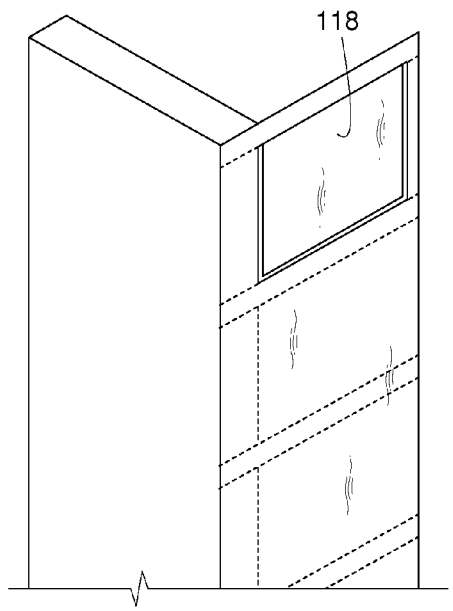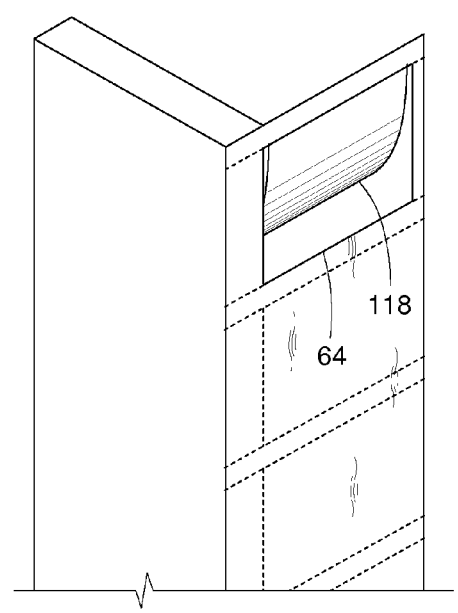

FIG. 55
FIG. 56
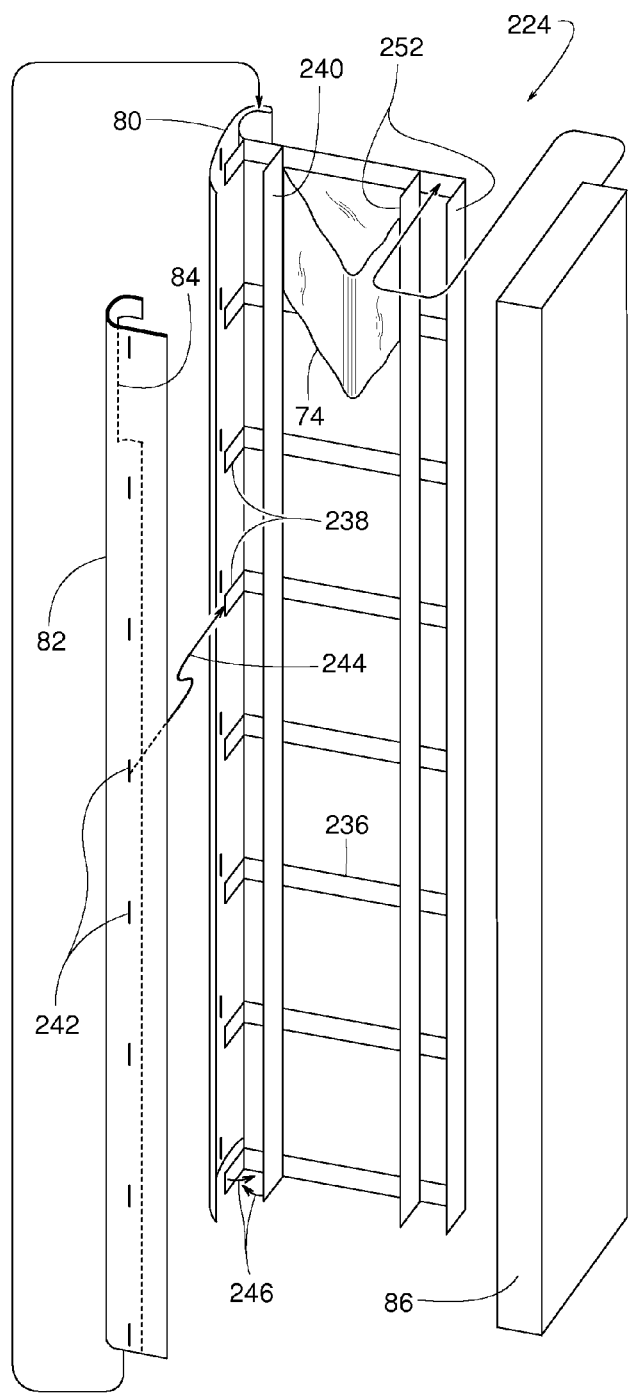
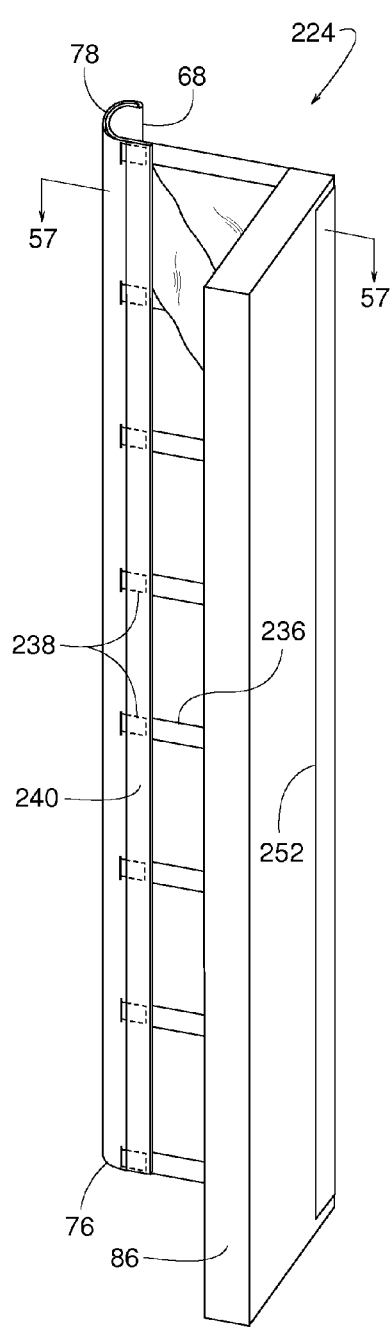

WEATHER BARRIER APPARATUSES FOR SEALING OR SHELTERING VEHICLES AT LOADING DOCKS

CROSS-REFERENCE TO RELATED APPLICATIONS

The patent arises from a continuation in part of U.S. patent application Ser. No. 13/933,848, filed on Jul. 2, 2013, entitled "Weather Barrier Apparatuses for Sealing or Sheltering Vehicles at Loading Docks," which is incorporated herein by reference in its entirety.

FIELD OF THE DISCLOSURE

The present disclosure relates generally to vehicle-actuated seal members and more specifically to weather barrier apparatuses for sealing or sheltering vehicles at loading docks.

BACKGROUND

Dock weather barriers (weather barrier apparatus), such as dock seals and dock shelters, address the need to prevent the ingress of outdoor environmental conditions or contaminants (e.g., rain, snow, wind, hot/cold temperatures, insects, animals, etc.) into the interior of a building and cargo area of a vehicle during the loading or unloading of the vehicle. Dock shelters and seals also address the need to prevent the egress of conditioned air from within a building and/or a vehicle cargo area to the outdoor environment. Examples of dock seals and/or shelters with various header structures and side structures are disclosed in U.S. Pat. Nos. 6,205,721; 6,233,885; 7,185,463 and 8,307,588.

Some known dock seals use side members having a compressible foam core or body surrounded by a coated fabric or vinyl outer layer. The foam core provides sufficient structural rigidity to enable the side members to be extended a short distance from the building wall surrounding the loading dock. The coated fabric outer layer protects the foam core from outdoor environmental conditions (e.g., moisture), provides wear resistance to repeated impacts from the rear portions of vehicles, and may provide desirable aesthetic qualities. Additionally, a header structure may span between and/or above the side members and is installed along a top portion of the loading dock opening. The header structure may be another compressible member similar in construction to the side members and, in some cases, may include a weighted fabric curtain that hangs downwardly to contact the top of a truck trailer to form an environmental barrier along the top of the trailer.

Another type of dock seal uses inflatable side members and a header structure having internal compressible resilient pads, which provide some degree of side member compressibility when the side members are in a deflated condition. In either case, when the rear portion of a vehicle (e.g., a truck trailer) is backed into either foam or inflatable dock seal side and header members, the side and header members are compressed toward the building wall to form a seal along the lateral and top back edges of the vehicle. If present, the head curtain sweeps along the top of the trailer to form a seal at the top of the trailer between the side members. Dock seals typically consume a relatively small amount of wall space and can provide a relatively high quality seal between the rear edges of a vehicle and the outside building wall surrounding the dock. However, when the dock seal side members are compressed, they may be displaced into or otherwise encroach on the opening to the rear of the docked vehicle. As a result, the compressed side member may interfere with operation of a fork lift and/or an operator during loading and unloading activities. In addition, inflatable dock seals are susceptible to power losses and tears that compromise the ability of the side members to inflate to provide an acceptable seal.

In contrast to dock seals, some known dock shelters use side members that are mounted to the outside building wall surrounding the loading dock. The side members are spaced well to the outside of the sides of a docked vehicle. The side members are configured to extend (i.e., to be cantilevered) an appreciable distance from the outside building wall, particularly in cases where a dock leveler protrudes from the dock opening. The side members may also support flexible seal members or side curtains extending inwardly from the side members across at least a portion of the opening defined by the side members. When a vehicle such as, for example, a truck trailer, is backed into the opening of the dock shelter, the inwardly facing edges of the seal members or side curtains resiliently deflect and sweep against the lateral sides of the trailer to form an environmental barrier therebetween. As with dock seals, dock shelters also typically include a header structure, which may include a head curtain, to form an environmental barrier along the top edge of the rear of the vehicle.

In contrast to dock seals, dock shelters typically provide unobstructed access to a vehicle cargo area opening (i.e., there are no foam pads or the like to be compressed and displaced into the opening). However, most known dock shelter side members are constructed using rigid wood, fiberglass or metal frames capable of supporting the significant weight of the seal members or side curtains, which are usually held at an appreciable distance (e.g., several feet) from the building wall. Such side members may be permanently deformed if they are impacted by a vehicle. Accordingly, bumpers or stops may be mounted to the lower edge of the dock shelter to prevent a vehicle (e.g., a truck trailer) from impacting and damaging the rigid shelter.

The rigid side members used to implement these known dock shelters are also typically mechanically coupled via the header and/or another rigid member to provide increased lateral rigidity to the dock shelter to minimize the ability of the side members to move from side-to-side. Because of this, the side members typically have to be mounted relatively far apart to accommodate a wide range of possible off-center vehicle positions. This relatively large distance between the rigid side members consumes a significant and, thus, expensive amount of building wall space for each loading dock opening.

More recently, dock shelters having impactable side members have been developed. The impactable side members are similar to those used with dock seals and typically use a foam core or body surrounded by a coated fabric outer layer. Seal members or side curtains, which may be constructed using a fabric and flexible fiberglass stays combination or a foam core and fabric combination, are typically mounted to the side members to extend at least partially across the shelter opening. When a vehicle is backed into the shelter, the inwardly facing edges of the seal members or side curtains deflect and sweep against the sides of the vehicle to form an environmental barrier or seal against the sides of the vehicle. In the event the off-center position of a vehicle results in the rear of the vehicle impacting a side member, the foam core or body of the side member is resiliently compressed. When the vehicle is pulled away from an impacted side member, the foam core of the side member causes the side member to substantially recover to its original condition or shape.

The areas of a loading dock shelter where the side seal members and the header's upper seal member meet and interact can cause sealing and wear problems. In some instances, a relatively stiff head curtain or other header sealing member will interfere with the side seal member's ability to seal along the vehicle's rear edge, near the roof of the vehicle. Because the upper seal member of a header structure is generally wider than the widest truck, the upper seal member overlaps the upper portion of the side seal members. As the vehicle pushes the lower edge of the header's upper seal member back towards the dock, the lower corners of the header's upper seal member will contact and push the face of the side seal member away from the side of the vehicle, thereby preventing a good seal in that area. There can also be excessive wear on the portion of the upper seal member that overlaps the side seal member. As the vehicle backs in and penetrates the weather barrier apparatus, the header's upper seal member can be pinched and dragged between the vehicle and the side seal members. This often causes premature wear on the side seal members.

In some examples, the areas of a loading dock shelter where the side seal members and the header's upper seal member meet and interact can cause sealing and wear problems. In some instances, a side curtain may interfere with the head curtain or other header seal member's ability to seal along a roof of a vehicle. The side seal, in some instances, can be positioned in front of, and can overlap an end portion of a header seal. As the vehicle pushes an upper portion of the side seal member back towards the dock, the upper portion of the side seal member may contact and push the face of the header curtain seal away from the roof of the vehicle, which may impede or hamper a seal in that area. There can also be excessive wear on the portion of the side seal member that overlaps the header curtain. As the vehicle backs in and penetrates the weather barrier apparatus, the side seal member can be pinched and dragged between the vehicle and the header curtain. This may cause premature wear on the header curtain.

BRIEF DESCRIPTION OF THE DRAWINGS

FIG. 3 is a cross-sectional view taken along line 3-3 of FIG. 1.

FIG. 4 is a cross-sectional view taken along line 4-4 of FIG. 2.

FIG. 5 is a cross-sectional view similar to FIG. 3 but showing a lower vehicle.

FIG. 6 is a cross-sectional view similar to FIG. 5 but showing the example weather barrier apparatus in an activated configuration.

FIG. 7 is a cross-sectional view taken along line 7-7 of FIG. 5.

FIG. 8 is a cross-sectional view taken along line 8-8 of FIG. 6.

FIG. 16 is a perspective view of another example side structure with another example cover constructed in accordance with the teachings disclosed herein.

FIG. 17 is a perspective view similar to FIG. 16 but showing the example cover open.

FIG. 18 is a perspective view of another example side structure with another example cover constructed in accordance with the teachings disclosed herein.

FIG. 19 is a perspective view similar to FIG. 18 but showing the example cover open.

FIG. 55 is an exploded perspective view of another example side structure with another example seal core constructed in accordance with the teachings disclosed herein.

FIG. 56 is a perspective view of the example side structure shown in FIG. 55 but showing the side structure assembled.

DETAILED DESCRIPTION

Figure 1:
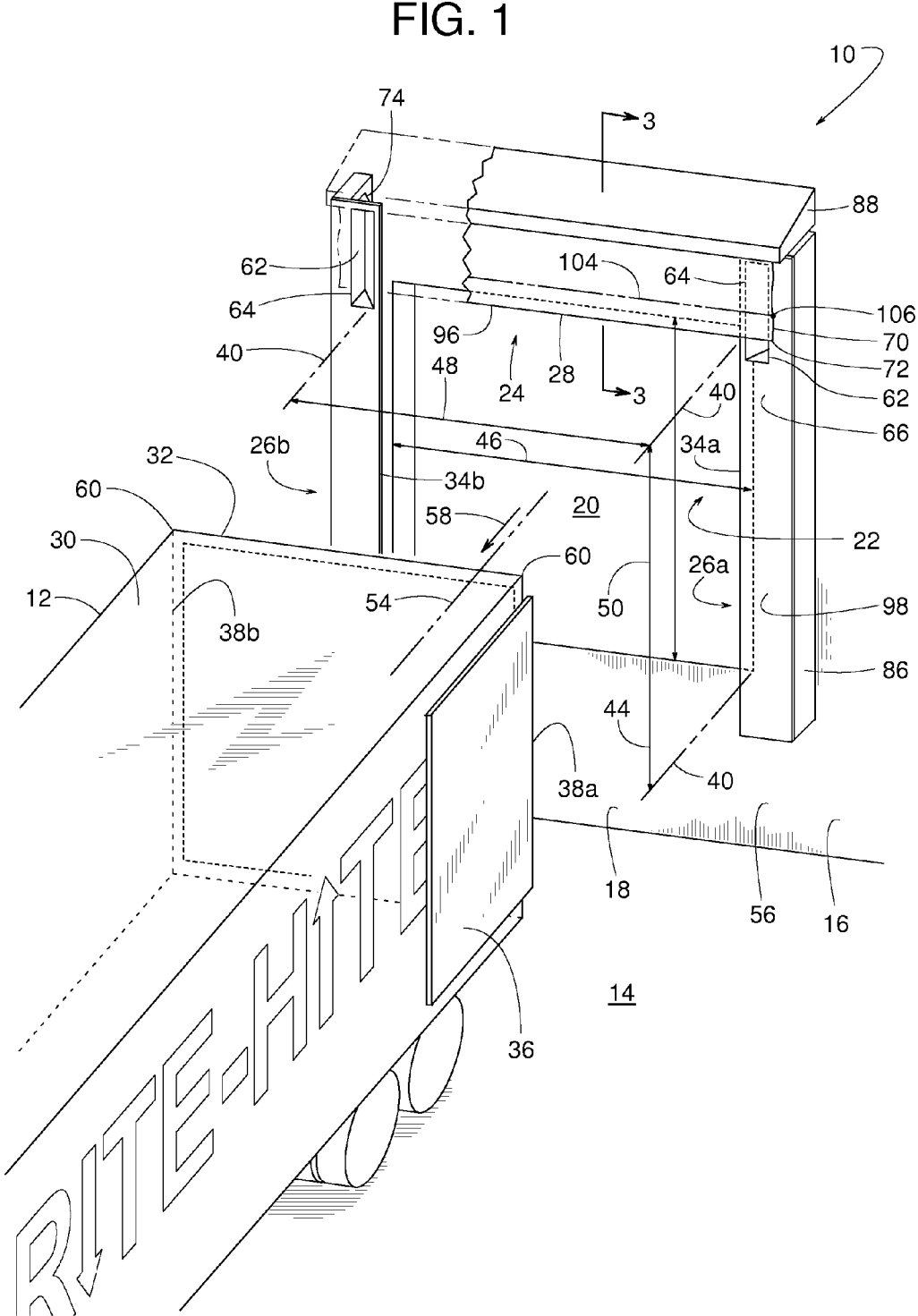
FIG. 1 is a partial cutaway perspective view of an example weather barrier apparatus constructed in accordance with the teachings disclosed herein. The weather barrier apparatus is shown in a relaxed configuration with a vehicle at a departed position.

Example weather barrier apparatuses for sealing or sheltering a vehicle at a loading dock are disclosed herein. Examples include a horizontally elongate upper seal member for sealing against the vehicle's roof and two vertically elongate side seal members for sealing against the sides and/or rear edges of the vehicle. The upper seal member is longer than the widest anticipated vehicle, and the side seal members are taller than the highest vehicle, so opposite ends of the upper seal member overlap the upper ends of the side seal members at two upper corners of some weather barrier apparatuses. Near these corners, each side seal member has an opening or pocket that provides room for the opposite ends of the upper seal member to pass through or penetrate the side seal members. Some side seal members have a hook-style rear edge seal with a slot for accommodating the vehicle's upper rear edge.

In some examples, a first seal (e.g., an upper seal or a side seal) is to be engaged by a vehicle as the vehicle moves between a departed position (e.g., a vehicle not in engagement with the weather barrier apparatus) and a parked position (e.g., a vehicle in engagement with the weather barrier apparatus) relative to the first seal. In some examples, the first seal has a penetration portion movable between a non-deflected position when the vehicle releases the first seal and a deflected position when the vehicle engages the first seal. In some examples, a second seal (e.g., an upper seal or a side seal) is to be coupled adjacent the first seal. In some examples, the second seal has an opening to be positioned adjacent the penetration portion of the first seal to enable at least the penetration portion to extend across at least a portion of the opening when the first seal is in the non-deflected position. In some examples, the opening of the second seal is to receive at least the penetration portion of the first seal when the first seal is in the deflected position.

In some examples, an example weather barrier apparatus disclosed herein includes a side support member attachable to a wall proximate a doorway. In some examples, a side seal member extends from the side support member and toward a center of the doorway when the weather barrier apparatus is in a non-deflected position (e.g., not in engagement with a vehicle). In some examples, at least a portion of the side seal member extends, bends and/or deflects toward the doorway and/or the wall when the weather barrier apparatus is in a deflected position (e.g., being engaged by a vehicle). In some examples, an upper seal is attachable to the wall and positioned adjacent the side support member such that a first portion of the upper seal and a second portion of the side seal overlap to define an interface. In some examples, the first portion of the upper seal does not engage the second portion of the side seal at the interface when the weather barrier is in a non-deflected position. In some examples, at least one of the side seal or the upper seal has an opening to receive at least a portion of the other one of the side seal or the upper seal when the weather barrier apparatus is in the deflected position.

Figure 62:
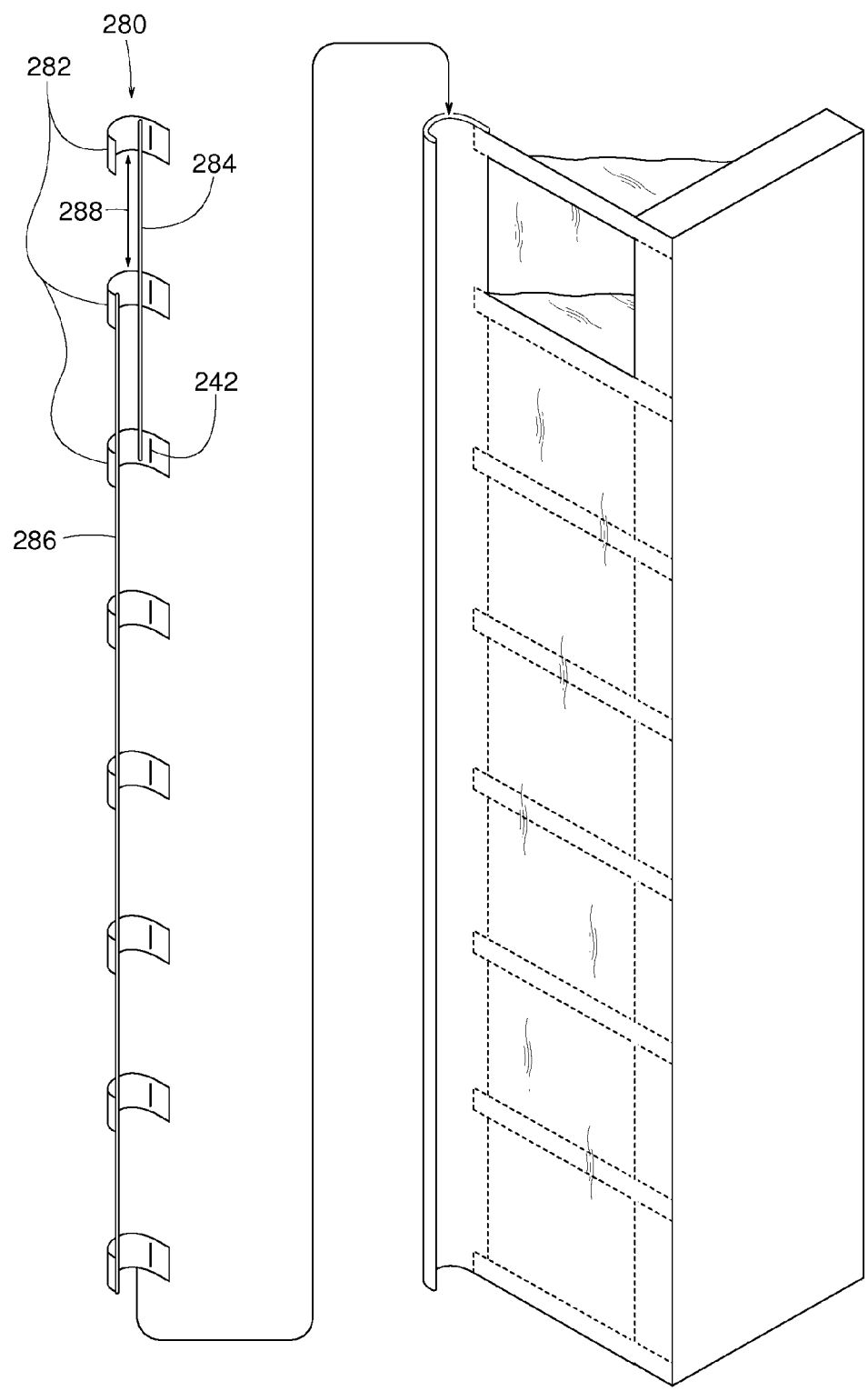
FIG. 62 is an exploded perspective view similar to FIG. 54 but showing another example of a seal core constructed in accordance with the teachings disclosed herein.

FIGS. 1-62 show an example weather barrier apparatus 10 and examples of its various alternatives, modifications and components for sealing or sheltering a vehicle 12 (e.g., truck, trailer, etc.) parked at a loading dock 14 of a building 16. The building 16 includes a wall 18 and a doorway 20 through which cargo is transferred between the vehicle 12 and an interior dock area 22 of the building 16. The weather barrier apparatus 10 disclosed herein are configurable selectively to a relaxed configuration (e.g., a non-deflected condition) separated from or not engaged by the vehicle 12 (e.g., FIGS. 1, 3, 5, 7, 22, 24, 26, 28, 30, 32, 34, 36, 38, 40, 42, 44, 47, 50, 52, 57, 58, 63, and 64) and an activated or deflected configuration engaging the vehicle 12 (e.g., FIGS. 2, 4, 6, 8, 23, 25, 27, 29, 31, 33, 35, 37, 39, 41, 43, 46, 49, 51 and 53). When separated from the example weather barrier apparatus disclosed herein, the vehicle 12 is in a departed position. When engaging the example weather barrier apparatus disclosed herein (e.g., as shown in FIGS. 2, 4, 6, 8, 23, 25, 27, 29, 31, 33, 35, 37, 39, 41, 43, 46, 49, 51 and 53) vehicle 12 is in a parked position.

In some examples, the weather barrier apparatus 10 includes a generally horizontally elongate header structure 24 proximate the top of the doorway 20 and two generally vertically elongate side structures 26a and 26b proximate the side edges of the doorway 20. The deader structure 24 includes an upper seal member 28 for sealing against a roof 30 and/or an upper rear edge 32 of the vehicle 12, and the side structures 26a and 26b include the side seal members 34a and 34b, respectively, for sealing against a side panel 36 and/or for sealing against the vertical rear edges 38a and 38b of the vehicle 12. Examples of the side panel 36 include, but are not limited to, an outward facing surface of an open rear door and a sidewall of a trailer or truck. In some examples, the side structure 26b and the side seal member 34b are mirror images of their respective the side structure 26a and the side seal member 34a, so descriptions of the side structure 26a and the side seal member 34a apply to their mirror-image counterparts as well.

When the weather barrier apparatus 10 in the activated configuration is sealing or sheltering the vehicle 12 in the parked position, cargo can be transferred along a cargo passageway 40 between the vehicle 12 and the building 16. The cargo passageway 40 is defined as a projection of doorway 20 leading to a rear access opening 42 (FIG. 3) in the vehicle 12, where the cargo passageway 40 has a passageway height 44 and a passageway width 46 equal to the building's doorway height 50 and width 48, respectively. The doorway's height 50 and the width 48 lie along a plane 52 (FIG. 3) that is generally parallel to the wall 18. A line 54 perpendicular to the plane 52 extends parallel to the general direction along which cargo would normally travel through the passageway 40. The wall 18 has an exterior surface 56 facing in a forward direction 58 parallel to the line 54. The terms "plane" and "line" means that the plane and the line pertain to geometry as opposed to an actual physical structure.

In some examples, in order to seal vehicles of various widths and heights, the side seal members 34a and 34b are taller than a highest anticipated vehicle, and the upper seal member 28 is horizontally longer than a widest anticipated vehicle. Consequently, the ends of the upper seal member 28 may overlap the side seal members 34a and 34b near the vehicle's upper rear corners 60. To effectively seal against the upper rear corners 60 of the vehicle 12 without the upper seal member 28 forcefully pressing against, abrading, displacing and/or interfering with the side seal member 34a and 34b at those corners, and to effectively seal against the vehicle's vertical rear edge 38a without the vehicle's upper rear edge 32 adversely displacing a hook-style rear edge seal in an area near the vehicle's upper rear corners 60, some examples of the side seal members 34a and 34b include features that provide clearance in those difficult areas. Examples of such clearance features include a header-receiving chamber or pocket 62 behind side seal member 34a, an opening 64 (e.g., hole, void, space, cavity, etc.) defined by a front panel 66 of side seal member 34a, and/or a special hook-style rear edge seal 68 (e.g., FIGS. 50 and 51). These clearance features function as follows.

As the vehicle 12 backs into and deflects the seal members 28, 34a and 34b, the opening 64 in the front panel 66 of the side seal member 34a allows a portion of the header structure 24 to pass through or penetrate the side seal member 34a, rather than displace it adversely. Examples of such a penetrating portion of the header structure 24 include, but are not limited to, a lateral edge 70 of upper seal member 28, a lower corner point 72 or the lowermost corner of upper seal member 28, etc. In some examples, the opening 64 leads to the header-receiving chamber 62, which is enclosed by a back sheet 74 to prevent air from flowing through the opening 64 and bypassing the side seal member 34a. In some examples, as shown in FIGS. 50-57, the rear edge seal 68 of the side seal member 34a is generally vertically elongate from a lower end 76 to an upper end 78 (FIG. 56) and includes a relatively stiff hook-shaped seal core 82 (FIG. 54) encased within a pliable seal cover 80. The hook profile allows the rear edge seal 68 to wrap around and seal against the vehicle's vertical rear edge 38a while, in some examples, the seal core 82 includes a notch or gap 84 that provides clearance for the vehicle's upper rear edge 32. The seal cover 80 spans the gap 84 and is sufficiently pliable to conform and seal around the vehicle's upper rear edge 32 in the area of the gap 84.

In the example illustrated in FIGS. 1-8, the weather barrier apparatus 10 shows the side seal member 34a attached to a side support member 86, which is mounted to the wall 18. The side support member 86 is schematically illustrated to represent any structure having any generally horizontal cross-sectional shape that can support the side seal member 34a such that the side seal member 34a can resiliently flex or move in reaction to the vehicle 12 backing into the weather barrier apparatus 10. In some examples, the side support member 86 is made of a resiliently compressible polyurethane foam core encased within a pliable or flexible sheet of material (e.g., encased within a vinyl coated fabric).

In the example shown in FIGS. 1-8, the upper seal member 28 is in the form of a flexible curtain suspended from an upper support member 88 of the header structure 24. In some examples, the upper support member 88 includes a frame 90 attached to the wall 18. In some examples, the frame 90 is pivotal about a pin 92 (FIG. 3), which allows the frame 90 to tilt upward in reaction to an exceptionally high vehicle backing into the weather barrier apparatus 10. To provide the upper seal member 28 with a desirable radius of rotation, a lower hanging the bracket 94 connects an upper edge of the upper seal member 28 to a front end of the frame 90. To protect the frame 90 and the bracket 94 from vehicular impact, some examples of the bracket 94 are more resiliently flexible than the frame 90 so that the bracket 94 can deflect rather than the bracket 94 or the frame 90 permanently bending or breaking upon being struck by a vehicle.

FIGS. 1-8 show how the lowermost corner point 72 of the seal member's lower edge 96 can pass through the opening 64 and protrude into the header-receiving chamber 62. FIGS. 1, 3, 5 and 7 show the vehicle 12 approaching the weather barrier apparatus 10 while the upper seal member 28 and the side seal member 34a extend into the cargo passageway 40. In some examples, when the weather barrier apparatus 10 is in the relaxed configuration, a front surface 98 on the front panel 66 of the side seal member 34a faces generally in a forward direction away from the doorway 20. FIGS. 2, 4, 6 and 8 show the vehicle 12 having deflected the side seal member 34a such that the side seal member 34a seals against the vehicle's side panel 36 and/or the vehicle's vertical rear edge 38a. In some examples, at least some portions of the front surface 98 become curved as the vehicle 12 deflects the side seal member 34a. FIGS. 2, 4, 6 and 8 also show the vehicle 12 having deflected the upper seal member 28 such that the upper seal member 28 seals against the vehicle's roof 30 and/or against the vehicle's upper rear edge 32. When the weather barrier apparatus 10 is in the activated configuration, the side seal member's front surface 98 engages the vehicle 12 and faces away from the upper seal member's lower corner point 72 (i.e., corner point 72 is now behind the side seal member's front surface 98). FIGS. 5-8 show the vehicle 12 being at a lower elevation and traveling closer to the wall 18 than what is shown in FIGS. 3 and 4. In some examples, such differences can determine where the seal members 28 and 34a seal against the vehicle 12.

FIG. 7 shows the opening 64 facing in a first direction 100 when weather barrier apparatus 10 is in the relaxed configuration. FIG. 8 shows the opening 64 facing in a different direction 102 when the weather barrier apparatus 10 is in the activated configuration. The change in direction facilitates at least a portion of the upper seal member 28 protruding into the opening 64 as the side seal member's front panel 66 deflects to place the front surface 98 in sealing contact with the vehicle 12. In some examples, to ensure the side seal member 34a reaches and sealingly engages the vehicle 12, the side seal member 34a extends laterally farther into cargo the passageway 40 when the weather barrier apparatus 10 is in the relaxed configuration (FIG. 7) than when the weather barrier apparatus 10 is in the activated configuration (FIG. 8).

Figure 2:
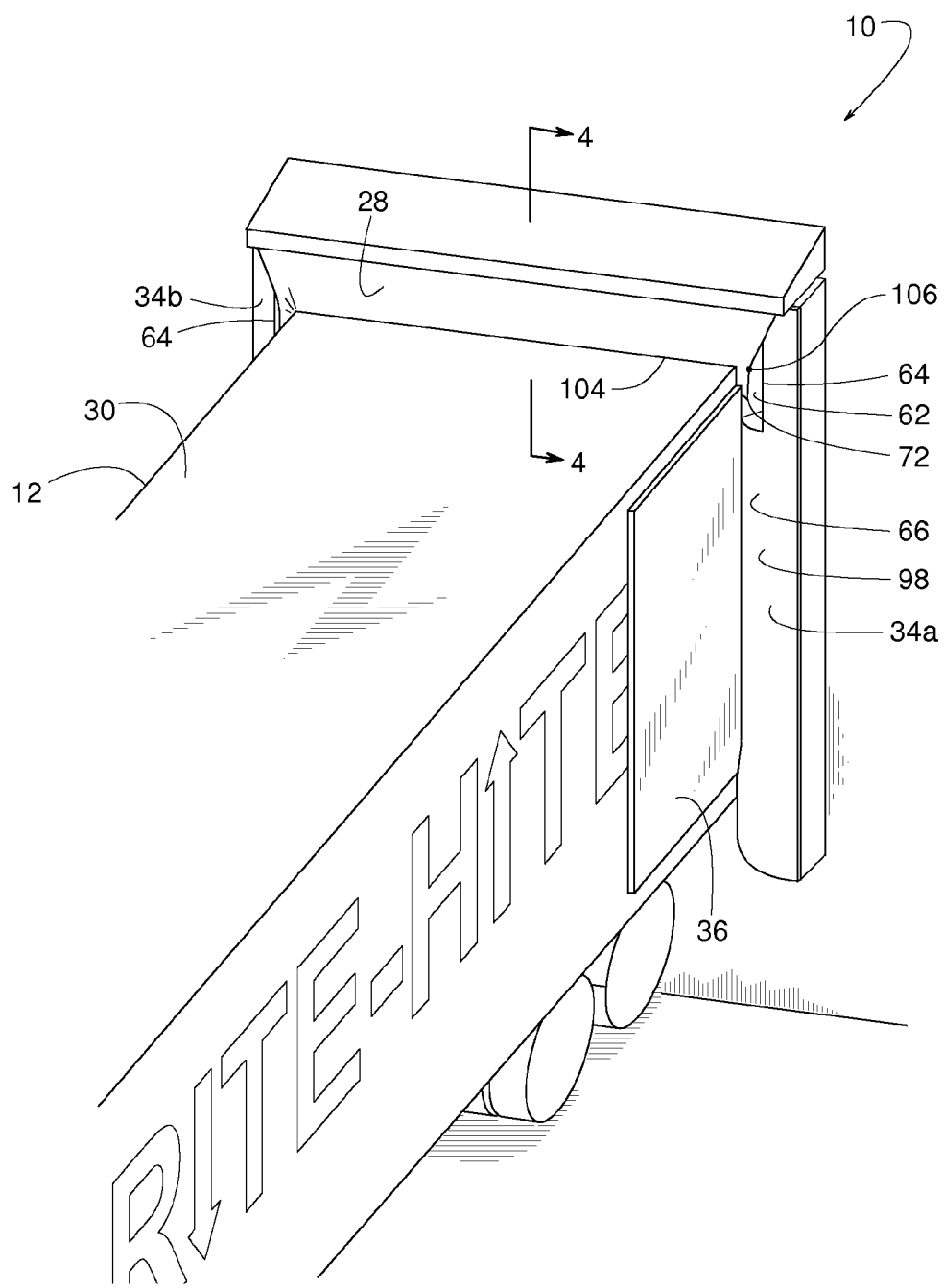
FIG. 2 is a perspective view similar to FIG. 1 but showing the example weather barrier apparatus in an activated configuration with the vehicle in the parked position.

FIGS. 1-4, 7 and 8 also show the upper seal member 28 being generally horizontally elongate along a substantially linear line segment 104 terminating at an endpoint 106 on the upper seal member 28. The line segment 104 lies along roof 30 when the weather barrier apparatus 10 is in the activated configuration with the vehicle 12 in the parked position, as shown in FIGS. 2, 4 and 8. The endpoint 106 is spaced apart from the roof 30 even when the weather barrier apparatus 10 is in the activated configuration with the vehicle 12 in the parked position. The seal member's front surface 98, as shown in FIG. 8, faces away from the endpoint 106 when the weather barrier apparatus 10 is in the activated configuration.

Figure 9:
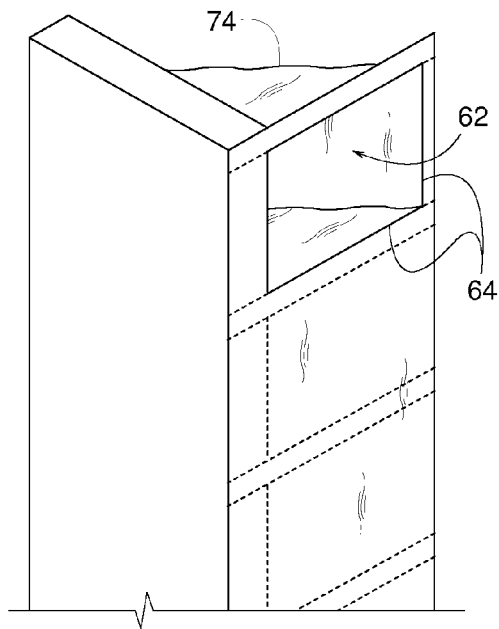
FIG. 9 is a perspective view of an example side structure constructed in accordance with the teachings disclosed herein.
Figure 10:
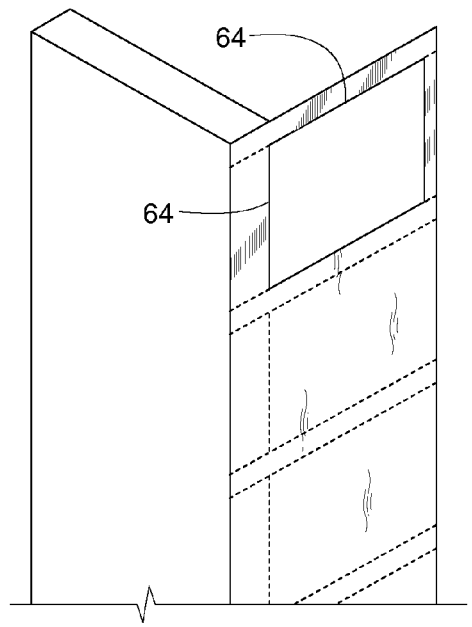
FIG. 10 is a perspective view of another example side structure constructed in accordance with the teachings disclosed herein.
Figure 11:
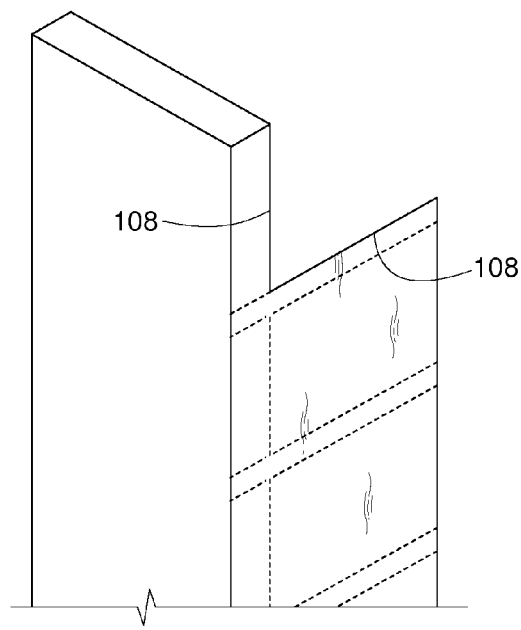
FIG. 11 is a perspective view of another example side structure constructed in accordance with the teachings disclosed herein.
Figure 12:
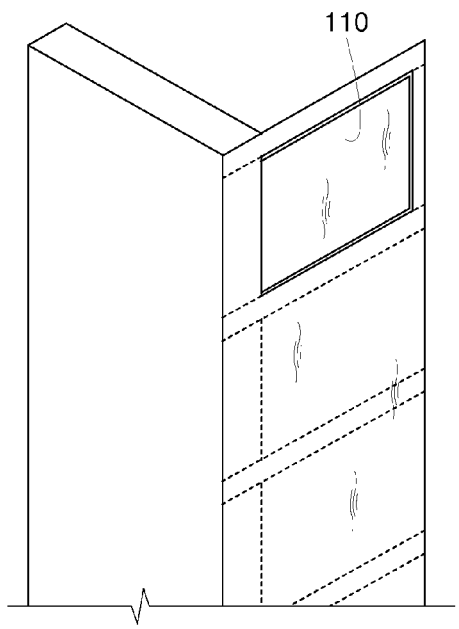
FIG. 12 is a perspective view of an example side structure with an example cover constructed in accordance with the teachings disclosed herein.
Figure 13:
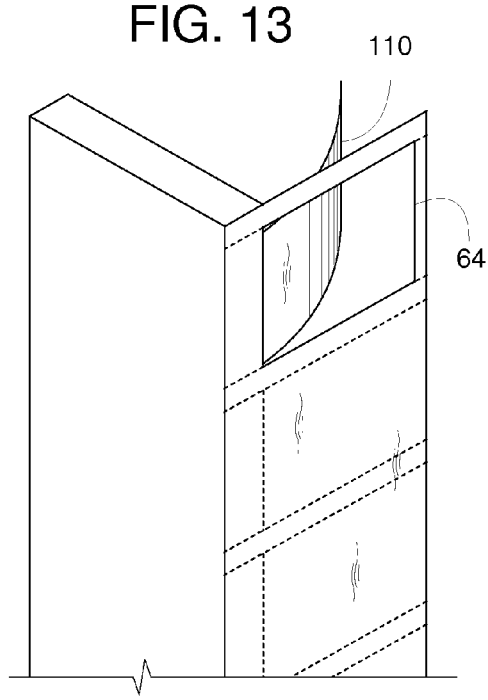
FIG. 13 is a perspective view similar to FIG. 12 but showing the example cover open.
Figure 14:
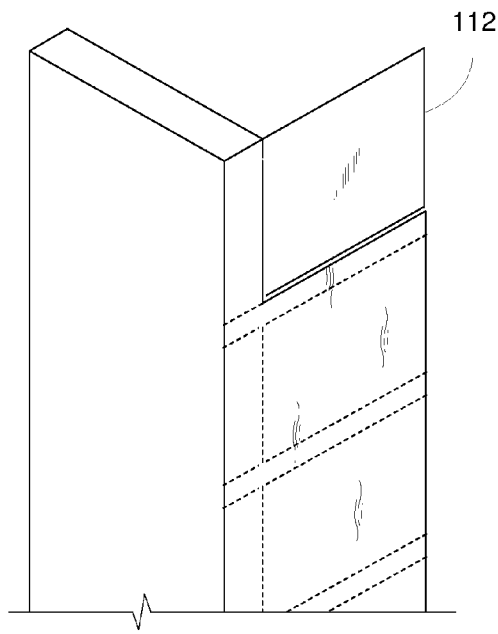
FIG. 14 is a perspective view of another example side structure with another example cover constructed in accordance with the teachings disclosed herein.
Figure 15:
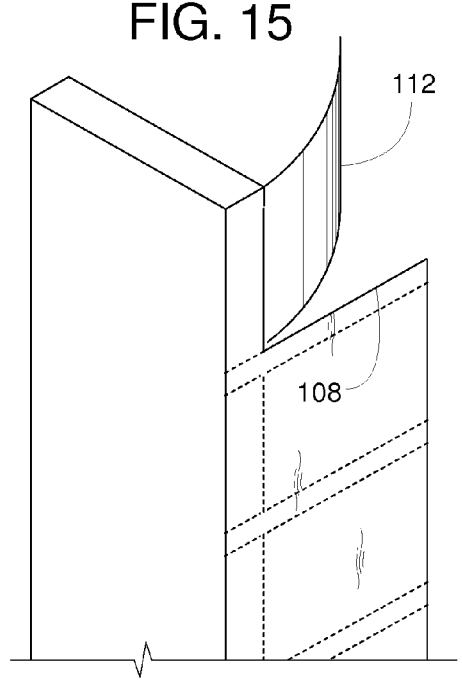
FIG. 15 is a perspective view similar to FIG. 14 but showing the example cover open.
Figure 20:
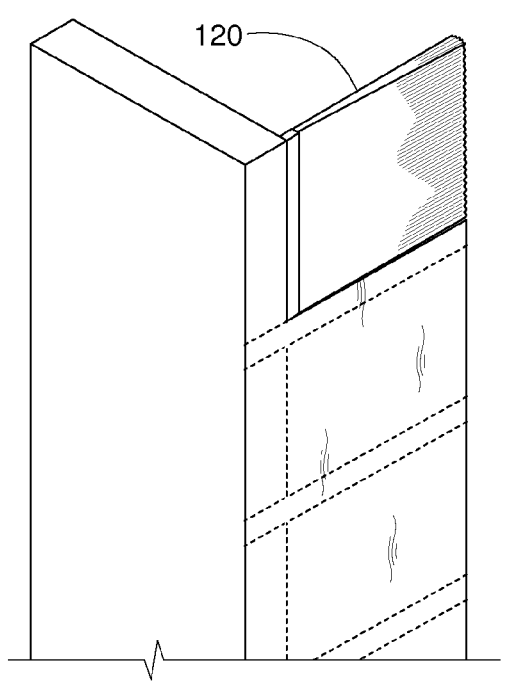
FIG. 20 is a perspective view of another example side structure with another example cover constructed in accordance with the teachings disclosed herein.
Figure 21:
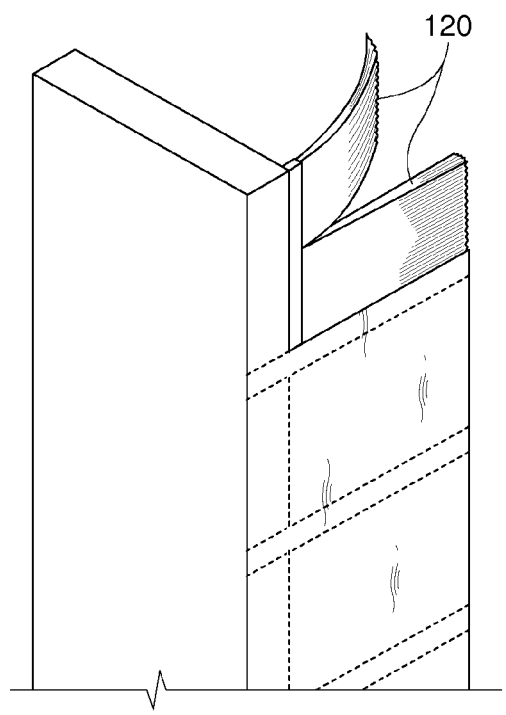
FIG. 21 is a perspective view similar to FIG. 20 but showing the example cover open.

FIGS. 9-25 illustrate various examples of side seal member openings that provide penetrating clearance for an upper seal member's lowermost corner. FIG. 9 shows the opening 64 leading to the header-receiving chamber 62, wherein the back sheet 74 encloses the back end of the chamber 62. The header-receiving chamber 62 can be of any shape, examples of which include, but are not limited to, triangular, rectangular, partially spherical, partially cylindrical, irregular, etc. In some examples, a cover (such as the example covers shown in FIGS. 12-25) extends across and obstructs the opening 64. In some examples, there is no cover across the opening 64, as shown in FIGS. 9 and 10. FIG. 10 further shows the opening 64 without enclosed the chamber 62. FIG. 11 shows an opening 108 that is not entirely surrounded by a frame. FIGS. 12 and 13 show a horizontally pivotal cover 110 across the opening 64, where FIG. 12 shows the cover 110 in a closed position, and FIG. 13 shows the cover 110 in an open position. FIGS. 14 and 15 show a horizontally pivotal cover 112 across an opening 108. FIG. 14 shows the cover 112 in a closed position, and FIG. 15 shows the cover 112 in an open position. FIGS. 16 and 17 show an example cover 114 including a plurality of independently pivotal segments 116. In some examples, a pliable web (not shown) extends between adjacent segments 116 to help prevent air from flowing between the segments 116. FIGS. 18 and 19 show a vertically pivotal cover 118 across the opening 64. FIG. 18 shows the cover 118 in a closed position, and FIG. 19 shows the cover 118 in an open position. FIGS. 20 and 21 show a cover 120 including a brush with a plurality of bristles. FIG. 20 shows the cover 120 in a closed position, and FIG. 21 shows the cover 120 in an open position.

Figure 22:
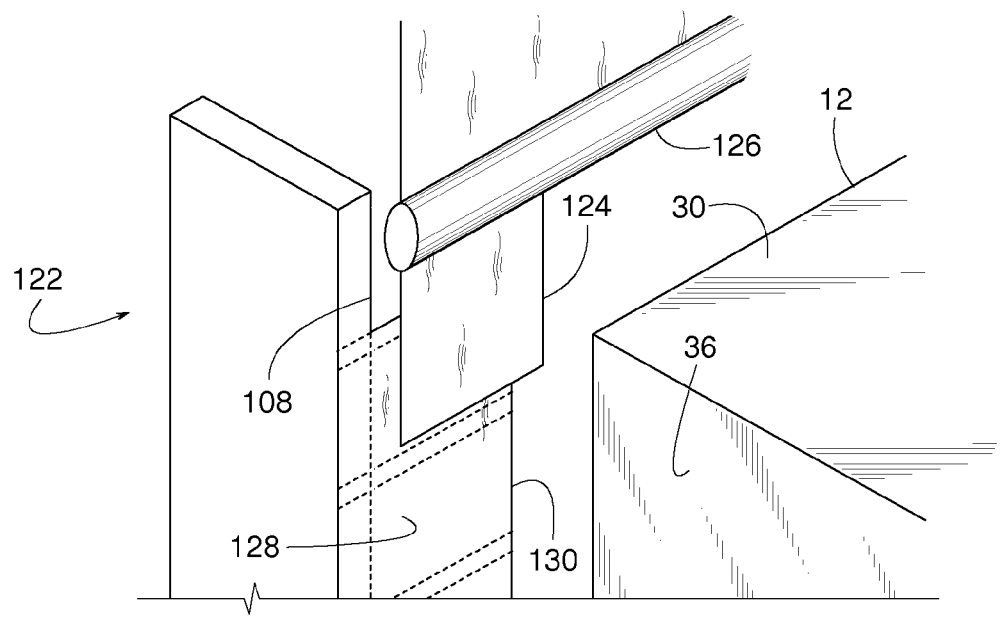
FIG. 22 is a perspective view of an example weather barrier apparatus with an example cover constructed in accordance with the teachings disclosed herein.
Figure 23:
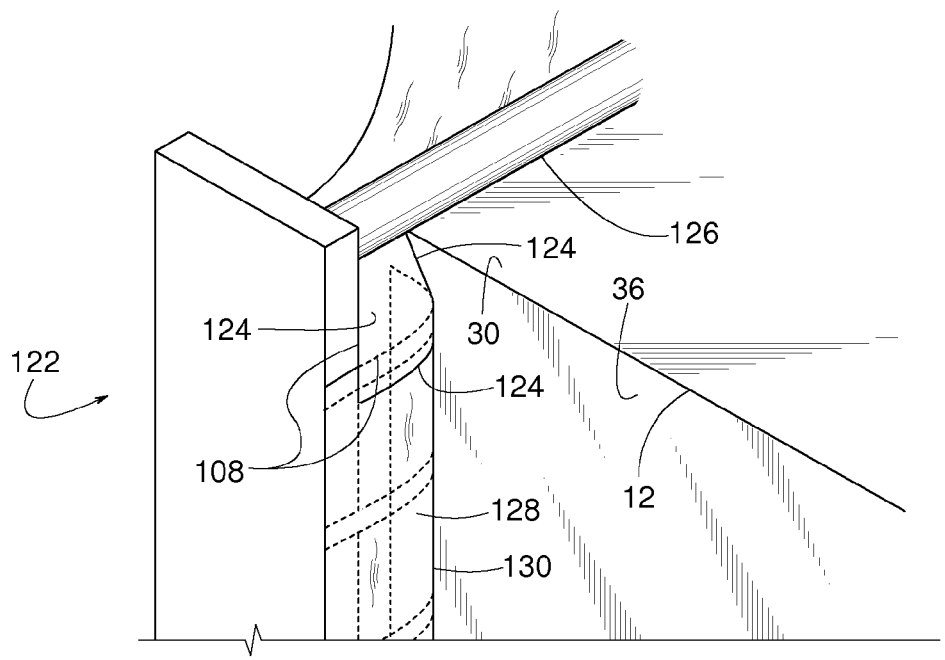
FIG. 23 is a perspective view similar to FIG. 22 but showing the example weather barrier apparatus in an activated configuration.

FIGS. 22 and 23 show an example weather barrier apparatus 122 with a cover 124 extending across the opening 108. In this example, the cover 124 hangs downward from an example upper seal member 126. As the vehicle 12 backs into the weather barrier apparatus 122 from the position shown in FIG. 22 to the position shown in FIG. 23, the vehicle 12 forces the upper seal member 126 up on top of the vehicle's roof 30. The vehicle 12 also forces the upper seal member 126 back through the opening 108 while the cover 124 overhangs and covers the opening 108. In the activated configuration shown in FIG. 23, a front surface 128 of a side seal member 130 deflects to seal against the vehicle's side panel 36.

Figure 24:
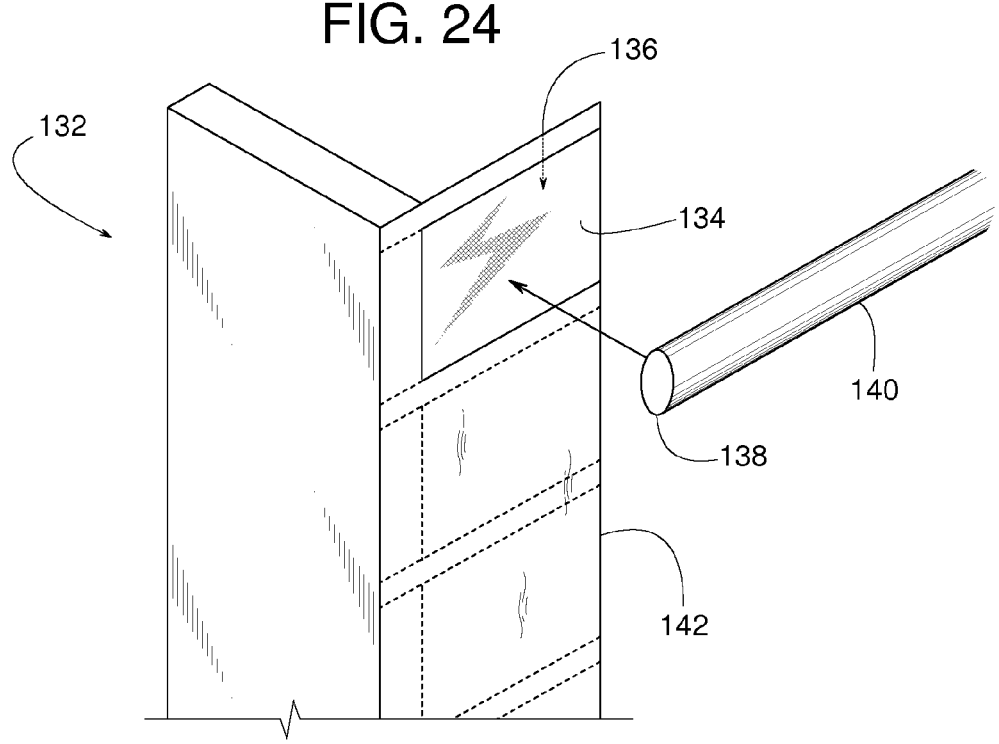
FIG. 24 is a perspective view of an example weather barrier apparatus with an example cover constructed in accordance with the teachings disclosed herein.
Figure 25:
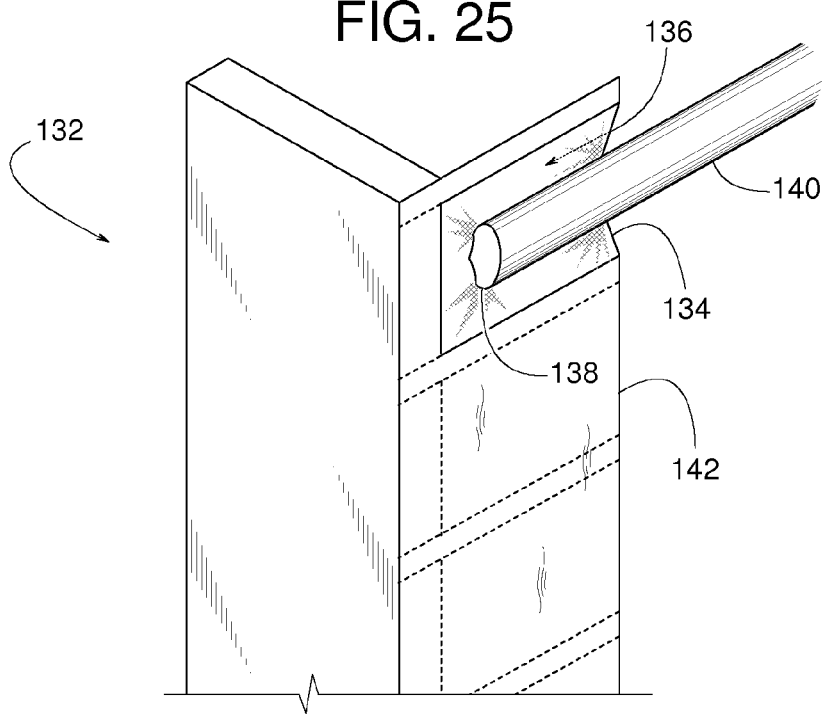
FIG. 25 is a perspective view similar to FIG. 24 but showing the example weather barrier apparatus in an activated configuration.

In the example shown in FIGS. 24 and 25, an example weather barrier apparatus 132 includes a side seal member 142 with a resiliently flexible or otherwise expandable cover 134 extending across and covering and/or obstructing an opening 136 or an open area behind the cover 134. Examples of the expandable cover 134 include, but are not limited to, corrugated material, elastic material, latex, etc. When a vehicle backs into the weather barrier apparatus 132, the vehicle forces a lower corner point 138 of an example upper seal member 140 back into and/or toward the opening 136 while the cover 134 resiliently expands into the opening 136, as shown in FIG. 25. The cover 134 remains expanded into the opening 136 as the vehicle (e.g., fully) deflects the side seal member 142 and forces the weather barrier apparatus 132 to the activated configuration (similar to FIG. 39).

Figure 26:
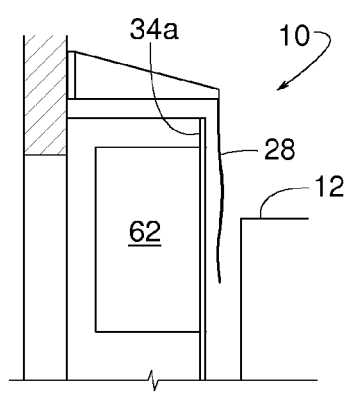
FIG. 26 is a cross-sectional view similar to FIG. 5 but showing less detail.
Figure 27:
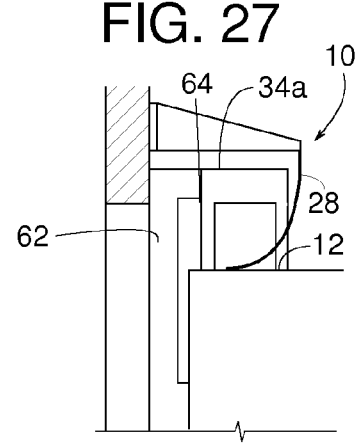
FIG. 27 is a cross-sectional view similar to FIG. 6 but showing less detail.
Figure 28:
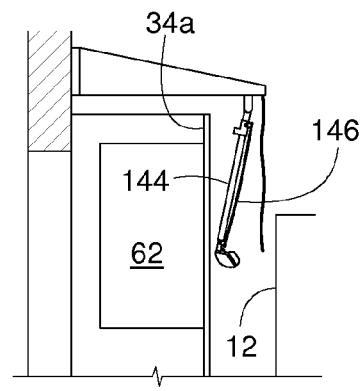
FIG. 28 is a cross-sectional view similar to FIG. 26 but showing an alternate example of a weather barrier apparatus constructed in accordance with the teachings disclosed herein.
Figure 29:
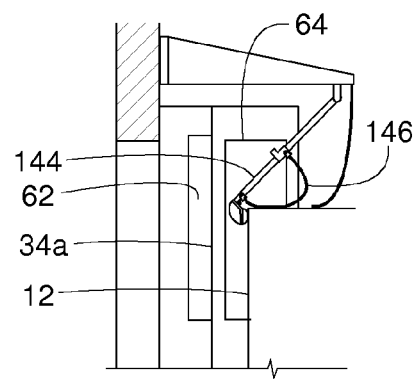
FIG. 29 is a cross-sectional view similar to FIG. 28 but showing the example weather barrier apparatus in an activated configuration.
Figure 30:
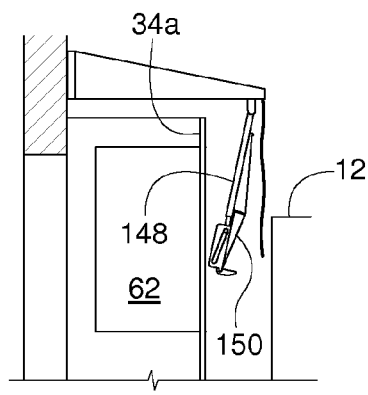
FIG. 30 is a cross-sectional view similar to FIG. 26 but showing another example of a weather barrier apparatus constructed in accordance with the teachings disclosed herein.
Figure 31:
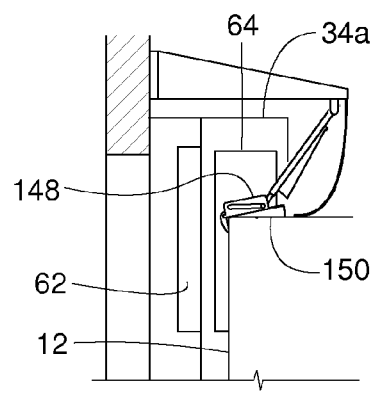
FIG. 31 is a cross-sectional view similar to FIG. 30 but showing the example weather barrier apparatus in an activated configuration.
Figure 32:
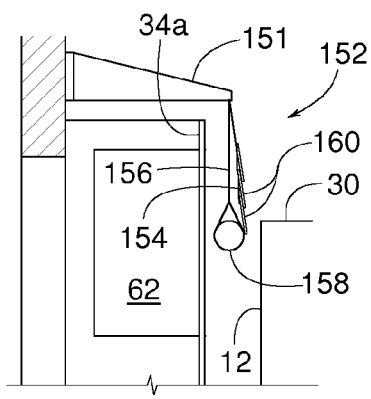
FIG. 32 is a cross-sectional view similar to FIG. 26 but showing another example of a weather barrier apparatus constructed in accordance with the teachings disclosed herein.
Figure 33:
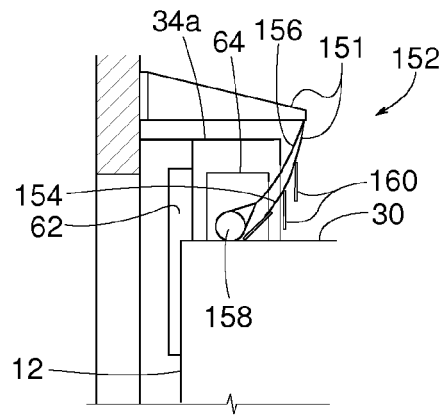
FIG. 33 is a cross-sectional view similar to FIG. 32 but showing the example weather barrier apparatus in an activated configuration.
Figure 34:
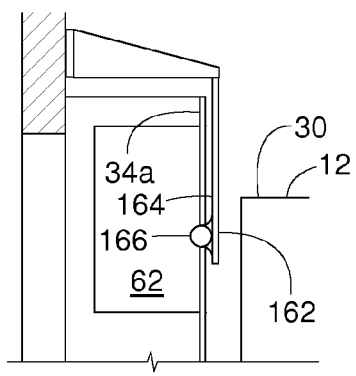
FIG. 34 is a cross-sectional view similar to FIG. 26 but showing another example of a weather barrier apparatus constructed in accordance with the teachings disclosed herein.
Figure 35:
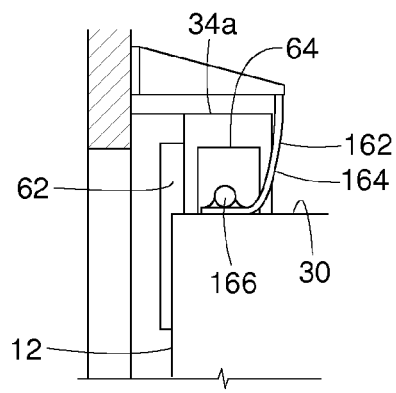
FIG. 35 is a cross-sectional view similar to FIG. 34 but showing the example weather barrier apparatus in an activated configuration.
Figure 36:
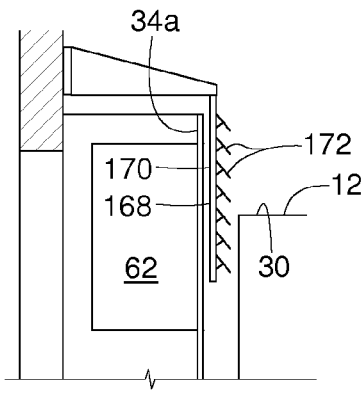
FIG. 36 is a cross-sectional view similar to FIG. 26 but showing another example of a weather barrier apparatus constructed in accordance with the teachings disclosed herein.
Figure 37:
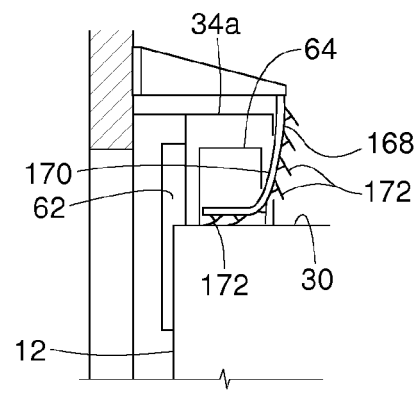
FIG. 37 is a cross-sectional view similar to FIG. 36 but showing the example weather barrier apparatus in an activated configuration.
Figure 38:
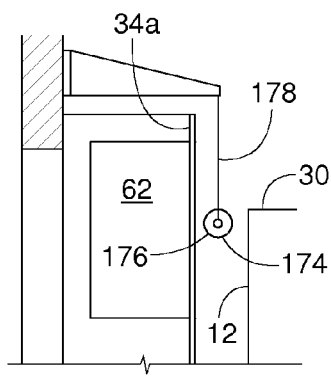
FIG. 38 is a cross-sectional view similar to FIG. 26 but showing another example of a weather barrier apparatus constructed in accordance with the teachings disclosed herein.
Figure 39:
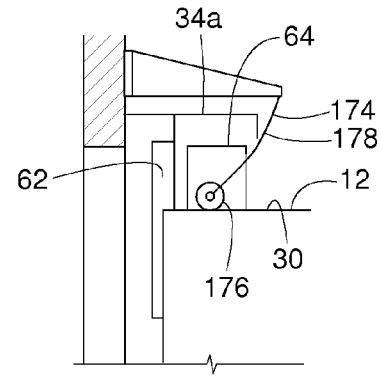
FIG. 39 is a cross-sectional view similar to FIG. 38 but showing the example weather barrier apparatus in an activated configuration.

FIGS. 26-39 show various example header structures with upper seal members each having a lower sealing edge with a lowermost corner that can pass through the opening 64 and, if provided with a header-receiving chamber 62, can protrude into the chamber 62. FIGS. 26, 28, 30, 32, 34, 36 and 38 show the example weather barrier apparatuses in a relaxed configuration with the vehicle 12 approaching but still in a departed or non-engaged position. FIGS. 27, 29, 31, 33, 35, 37 and 39 show the example weather barrier apparatuses in an activated configuration with the vehicle 12 in a parked or engaged position. The example shown in FIGS. 26 and 27 is basically the same as the example shown in FIGS. 1-8. FIGS. 28 and 29 show an example upper seal member 144 with an expanding bulb seal 146. FIGS. 30 and 31 show an example upper seal member 148 with a compressible rear edge seal 150. FIGS. 32 and 33 show an example header structure 151 with an upper seal member 152 including a front sheet 154 and a back sheet 156. A cylinder 158 hanging from back sheet 156 seals down against the vehicle's roof 30. A plurality of seal segments 160 hanging from the front sheet 154 also seal against the roof 30, as shown in FIG. 33. FIGS. 34 and 35 show an example upper seal member 162 including a resiliently compressible foam sheet 164 with an added weight 166 that helps push the foam sheet 164 tightly down against the vehicle's roof 30. FIGS. 36 and 37 show an example upper seal member 168 including a flexible sheet 170 (e.g., a fabric sheet or a resiliently compressible form sheet) with a plurality of pleats 172 that flex to seal against the vehicle's roof 30. FIGS. 38 and 39 show an example upper seal member 174 including a weighted cylinder 176 hanging from a flexible sheet 178. The weighted cylinder 176 seals down against the vehicle's roof 30, as shown in FIG. 39.

Figure 40:
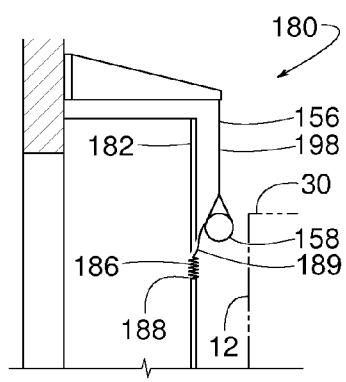
FIG. 40 is a cross-sectional view similar to FIG. 26 but showing another example of a weather barrier apparatus constructed in accordance with the teachings disclosed herein.
Figure 41:
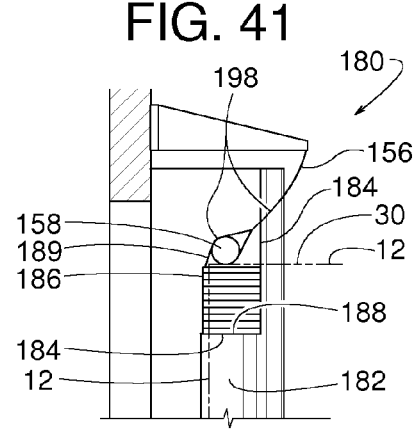
FIG. 41 is a cross-sectional view similar to FIG. 40 but showing the example weather barrier apparatus in an activated configuration.

FIGS. 40-49 show additional example weather barrier apparatus employing a header structure having an upper seal member extending into an opening of a side seal member. FIGS. 40 and 41, for instance, show an example weather barrier apparatus 180 including a side seal member 182 that has an opening 184 similar to the opening shown in FIG. 11. However, an expandable cover 186 extends between a lower edge 188 of the opening 184 and the lower end of an upper seal member 198, where some examples of the upper seal member 198 include cylinder 158 and sheet 156. Examples of the expandable cover 186 include, but are not limited to, a bellows, elastic sheet of material, sheet wrapped about a spring loaded take-up roller, concertina sheet, folded sheet, corrugated sheet, etc. In this example, the cover 186 is normally open when the weather barrier apparatus 180 is in the relaxed configuration shown in FIG. 40. As the vehicle 12 backs into the weather barrier apparatus 180, the side seal member 182 deflects to seal against the vehicle's side panel 36 (FIG. 1), and the vehicle 12 forces the cylinder 158 of an example upper seal member 198 up on top of the vehicle's roof 30, as shown in FIG. 41. The cylinder 158 is longer than the vehicle's width, so the ends of the cylinder 158 protrude through the opening 184 (similar to FIG. 8). As the vehicle 12 forces the cylinder 158 on top of the roof 30, as shown in FIG. 41, an elastic connection 189 (e.g., elastic cord, elastic fabric, etc.) pulls the upper end of the cover 186 up against the bottom of the cylinder 158. In some examples, the opening 184 has a pair of generally vertical tracks that guide the vertical movement of the cover 186.

Figure 42:
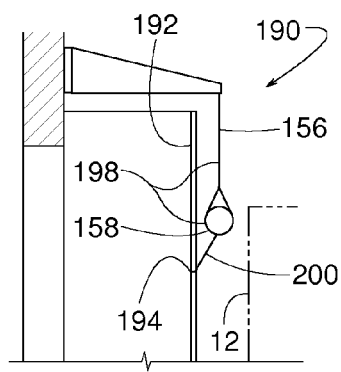
FIG. 42 is a cross-sectional view similar to FIG. 26 but showing another example of a weather barrier apparatus constructed in accordance with the teachings disclosed herein.
Figure 43:
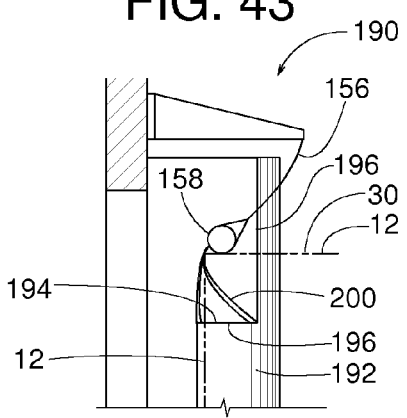
FIG. 43 is a cross-sectional view similar to FIG. 42 but showing the example weather barrier apparatus in an activated configuration.

An example weather barrier apparatus 190 shown in FIGS. 42 and 43 is similar to the example shown in FIGS. 40 and 41. However, the weather barrier apparatus 190 has a non-pleated or non-corrugated expandable cover 200 in the form of an elastic sheet that extends between a lower edge 194 of an opening 196 and the lower end of the upper seal member 198. As the vehicle 12 backs into the weather barrier apparatus 190, an example side seal member 192 deflects to seal against the vehicle's side panel 36 (FIG. 1), and the vehicle 12 forces the cylinder 158 up on top of the vehicle's roof 30. The cylinder 158 is longer than the vehicle's width, so the ends of the cylinder 158 protrude through the opening 196. As the vehicle 12 forces the cylinder 158 on top of the roof 30, as shown in FIG. 43, the cylinder 158 pulls the cover 200 up across the opening 196 and up against the rear end of the vehicle 12.

Figure 44:
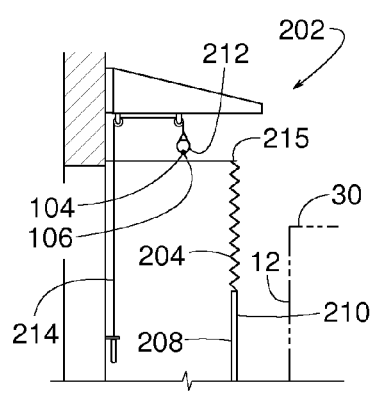
FIG. 44 is a cross-sectional view similar to FIG. 26 but showing another example of a weather barrier apparatus constructed in accordance with the teachings disclosed herein.
Figure 45:
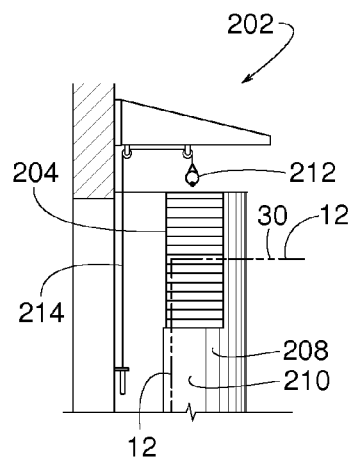
FIG. 45 is a cross-sectional view similar to FIG. 44 but showing the vehicle (in phantom lines) engaging the example weather barrier apparatus.
Figure 46:
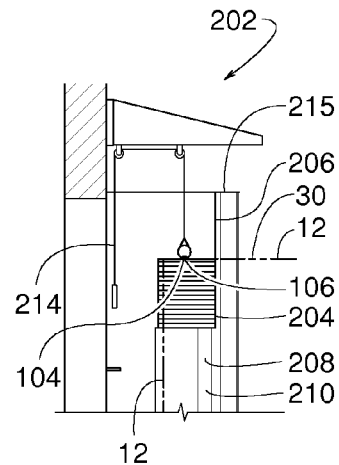
FIG. 46 is a cross-sectional view similar to FIG. 44 but showing the example weather barrier apparatus in an activated configuration.

FIGS. 44-46 show an example the weather barrier apparatus 202 including a vertically expandable cover 204 extending across an opening 206 in a side seal member 208. The cover 204, the opening 206 and the side seal member 208 are similar respectively to the cover 186, the opening 184 and the side seal member 182 shown in FIGS. 40 and 41. However, the cover 204 is spring loaded or otherwise biased to the closed position shown in FIGS. 44 and 45. As the vehicle 12 backs into the weather barrier apparatus 202, as shown in FIG. 45, the side seal member 208 deflects such that a front surface 210 of the side seal member 208 seals against the vehicle's side panel (e.g., side panel 36 in FIG. 1), as represented in FIG. 45. To seal the vehicle's roof 30, an upper seal member 212 is subsequently lowered from the position shown in FIG. 45 to that of FIG. 46. This places the upper seal member 212 in sealing contact with the vehicle's roof 30 and also collapses the cover 204 to the position shown in FIG. 46. In some examples, the upper seal member 212 is equal or comparable to the upper seal members shown in FIGS. 26, 27 and 38-39. The upper seal member 212 can be raised and lowered by any suitable means, examples of which include, but are not limited to, a manually operated cord 214 movable between a free position (FIG. 46) and an anchored position (FIGS. 44 and 45), a winch, etc.

FIGS. 44-46 also show an endpoint 106 and an end view of the line segment 104 with respect to the upper seal member 212. When the weather barrier apparatus 202 is in the relaxed configuration, as shown in FIG. 44, the endpoint 106 and the line segment 104 are above an uppermost edge 215 of the side seal member 208. When the weather barrier apparatus 202 is in the activated configuration, as shown in FIG. 46, the line segment 104 lies atop of the roof 30 while the endpoint 106 is below the side seal member's uppermost edge 215. Also, when the weather barrier apparatus 202 is in the activated configuration, the front surface 210 faces away from the endpoint 106, just as FIG. 8 shows the front surface 98 facing away from the endpoint 106.

Figure 47:
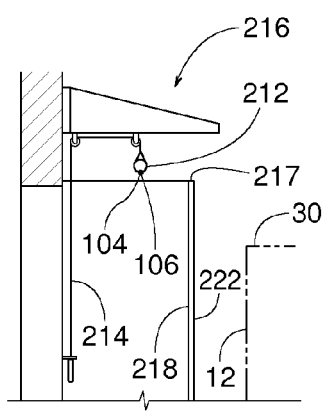
FIG. 47 is a cross-sectional view similar to FIG. 26 but showing another example of a weather barrier apparatus constructed in accordance with the teachings disclosed herein.
Figure 48:
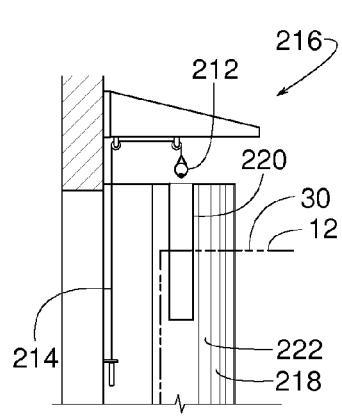
FIG. 48 is a cross-sectional view similar to FIG. 47 but showing the vehicle (in phantom lines) engaging the example weather barrier apparatus.
Figure 49:
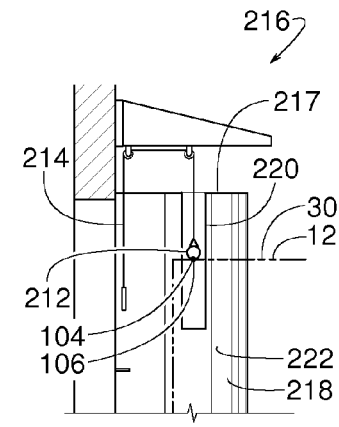
FIG. 49 is a cross-sectional view similar to FIG. 47 but showing the example weather barrier apparatus in an activated configuration.

FIGS. 47-49 show an example weather barrier apparatus 216 including a side seal member 218 with an opening 220 in the form of a slot. In response to the vehicle 12 backing into the weather barrier apparatus 216 from the position shown in FIG. 47 to the position shown in FIG. 48, the side seal member 218 deflects such that a front surface 222 of the side seal member 218 seals against the vehicle's side panel (e.g., side panel 36). To seal the vehicle's roof 30, the upper seal member 212 (which is longer than the vehicle's width) is subsequently lowered down through the opening 220 from the position shown in FIG. 48 to that of FIG. 49. This places the upper seal member 212 in sealing contact with the vehicle's roof 30. The upper seal member 212 can be raised and lowered by any suitable means, examples of which include, but are not limited to, manually operated cord 214 movable between a free position (FIG. 49) and an anchored position (FIGS. 47 and 48), a winch, etc.

FIGS. 47-49 also show endpoint 106 and an end view of the line segment 104 with respect to the upper seal member 212. In some examples, when the weather barrier apparatus 216 is in the relaxed configuration, as shown in FIG. 47, the endpoint 106 and the line segment 104 are above an uppermost edge 217 of the side seal member 218. When the weather barrier apparatus 216 is in the activated configuration, as shown in FIG. 49, the line segment 104 lies atop of the roof 30 while the endpoint 106 is below the side seal member's uppermost edge 217. Also, when the weather barrier apparatus 216 is in the activated configuration, the front surface 222 faces away from the endpoint 106, just as FIG. 8 shows the front surface 98 facing away from the endpoint 106.

In order to overcome the difficulty of sealing near the vehicle's upper rear corners 60 (FIG. 1), rear edge seals of some example side seal members have a hook profile. In some examples, a notch is strategically placed near the upper portion of the hook's core. The notch length and position covers the range of heights of the vehicle roofs expected to be encountered at the loading dock. A pliable cover wraps around the hook's core and connects to the side curtain. While the core of the hook has some flexibility for conforming to the contours of the rear edge of the vehicle, the more flexible pliable cover provides added sealing ability to the hook.

Figure 50:
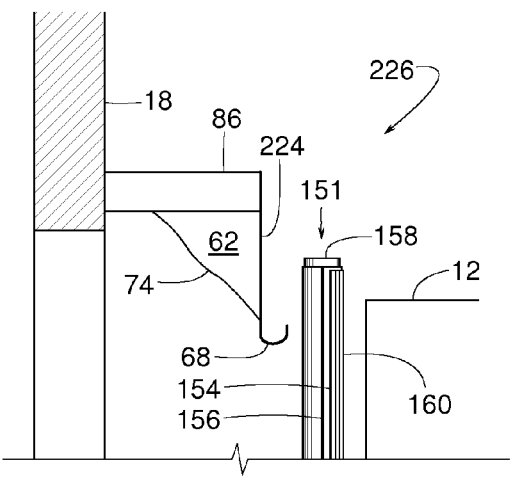
FIG. 50 is a cross-sectional view taken along line 50-50 of FIG. 52.
Figure 51:
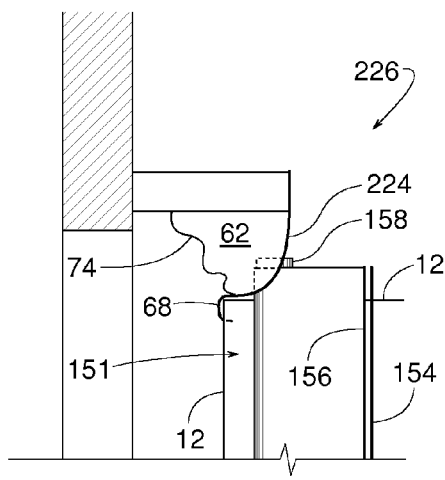
FIG. 51 is a cross-sectional view taken along line 51-51 of FIG. 53.
Figure 52:
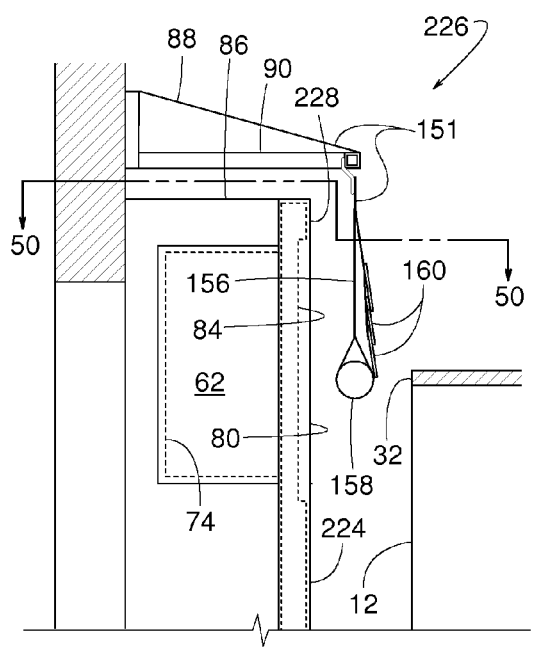
FIG. 52 is a cross-sectional view similar to FIG. 5 but showing another example of a weather barrier apparatus constructed in accordance with the teachings disclosed herein.
Figure 53:
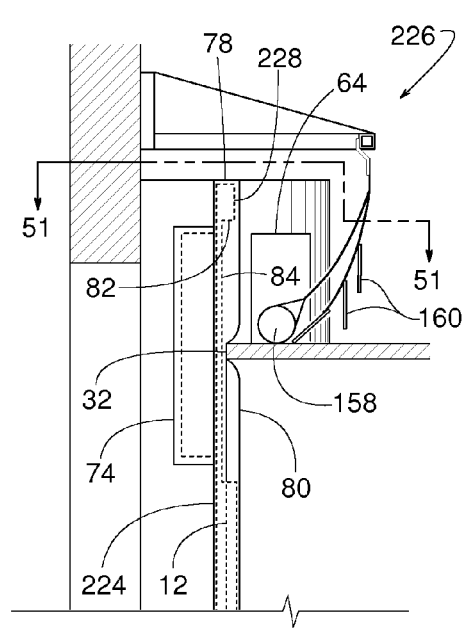
FIG. 53 is a cross-sectional view similar to FIG. 52 but showing the example weather barrier apparatus in an activated configuration.
Figure 54:
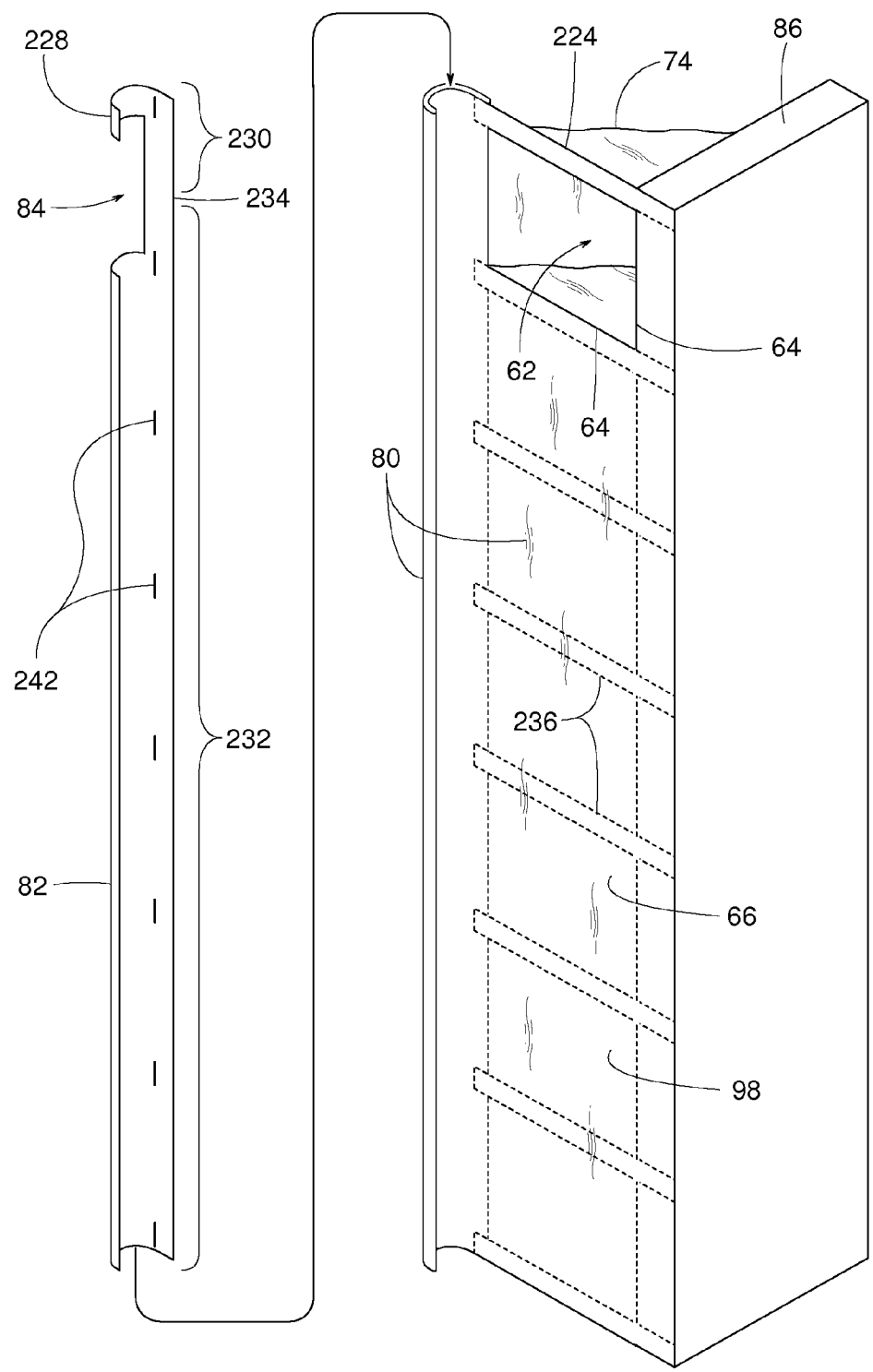
FIG. 54 is an exploded perspective view of an example side structure with an example seal core constructed in accordance with the teachings disclosed herein.

FIGS. 50-62 show example hook-style rear edge seals that can be used with various header structures and/or side structures including, but not limited to, the example header structures and side structures shown in FIGS. 1-49 and 63-66. FIGS. 50-56, for instance, show an example side seal member 224 with hook-style rear edge seal 68 being used with header structure 151 (FIGS. 32 and 33) to provide an example weather barrier apparatus 226. FIGS. 50 and 52 show the weather barrier apparatus 226 in the relaxed configuration. FIGS. 51 and 53 show the weather barrier apparatus 226 in an activated configuration. FIG. 54 is an exploded view showing an example core 82 about to be inserted within the cover 80. FIG. 55 is an exploded view showing the seal core 82 about to be inserted within the seal cover 80 and the side support member 86 about to be attached to the side seal member 224. FIG. 56 is a perspective view of the side seal member 224 attached to side support member 86.

As mentioned earlier, the hook profile allows the rear edge seal 68 to wrap around and seal against the vehicle's vertical rear edge 38*a* while, in some examples, the seal core 82 includes a notch or gap 84 that provides clearance for the vehicle's upper rear edge 32. The seal cover 80 spans the gap 84 and is sufficiently pliable to conform and seal around the vehicle's upper rear edge 32 in the area of the gap 84. A projection 228 at the very top of the hook is positioned above the top of the tallest anticipated vehicle, and the vehicle's upper rear edge 32 projects into the gap 84.

Although the actual construction, assembly and other design details may vary, in some examples, the hook's core 82 is made of a flexible material that is stiffer than the cover 80. Example materials of the seal core 82 include, but are not limited to, 1/16"-1/8" thick UHMW (ultra high molecular weight polyethylene), other plastics, materials of other thicknesses, spring steel, and various combinations of materials. In some examples, as shown in FIG. 54, the seal core 82 includes an upper section 230 and a lower section 232 that are an integral extension of each other, whereby the seal core 82 is a unitary piece, and the gap 84 is a notch at an interface 234 between sections 230 and 232. Example materials of the seal cover 80 include, but are not limited to, 22-once or 44-once vinyl coated fabric, nylon fabric, polyester fabric, non-fabric plastic sheeting, etc.

In some examples, the cover 80 wraps around the core 82 and extends across a plurality of flexible stays 236 to provide the side seal member 224 with the front panel 66 with the front surface 98 (FIG. 54). The stays 236 help support the more flexible cover 80 and provide the front panel 66 with resilience. Example materials of the stays 236 include, but are not limited to, fiberglass and spring steel.

To hold the core 82 within the cover 80, some examples of the side seal member 224 have a plurality of connecting tabs 238 and a mating connecting strip 240 that overlap to close the cover 80 and hold the core 82 in place. In some examples, the tabs 238 and the strip 240 are made of mating touch-and-hold fastener elements, such as VELCRO, which is a registered trademark of Velcro Industries, of Manchester, N.H. Referring to FIG. 55, to assemble the core 82 and the cover 80, the tabs 238 are positioned or inserted through a plurality of slots 242 in the core 82, as indicated by arrow 244, and the strip 240 folds over onto and connects to tabs 238, as indicated by arrows 246.

Figure 57:
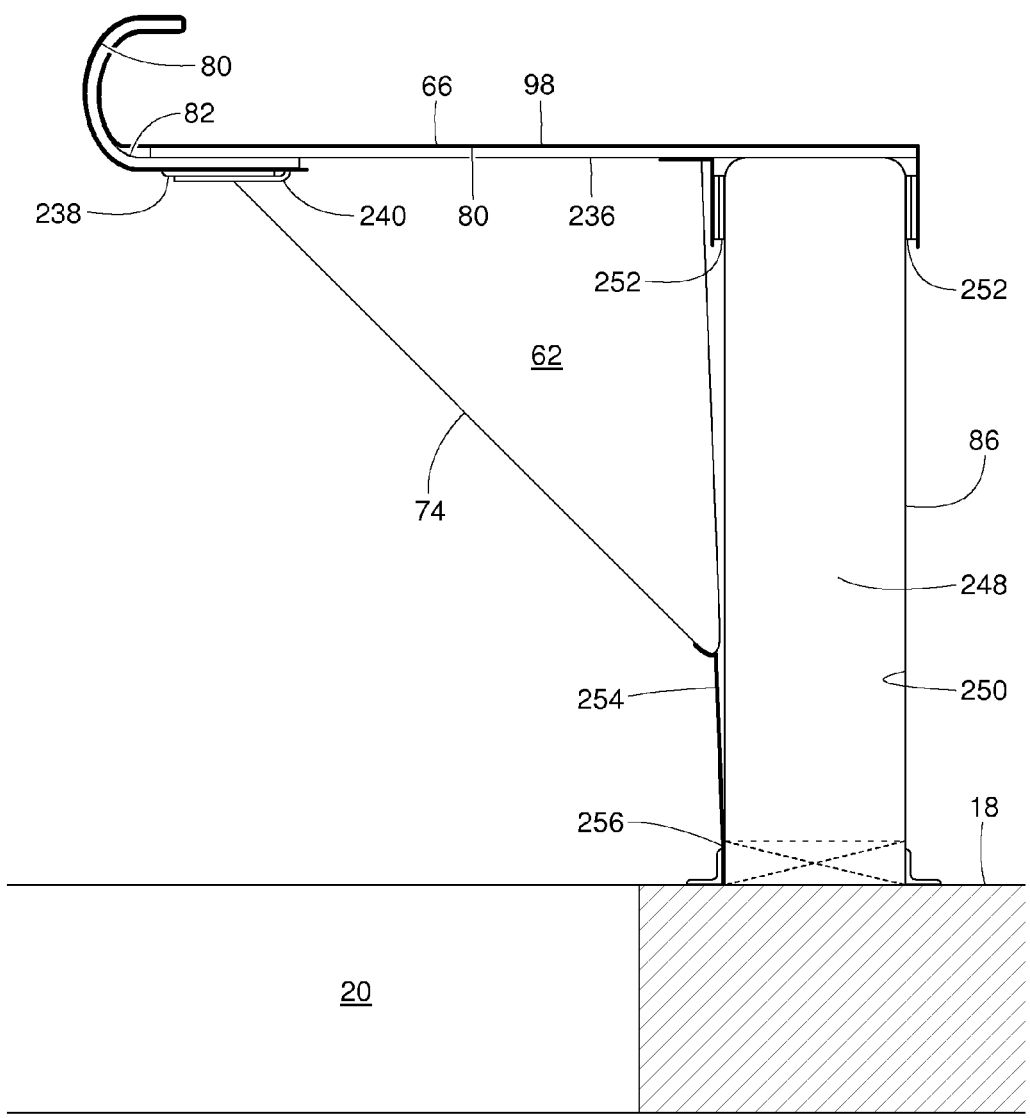
FIG. 57 is a cross-sectional view taken along line 57-57 of FIG. 56.

The side seal member 224 can be attached to any suitable side support member including, but not limited to, the side support member 86. In some examples, as shown in FIG. 57, the side support member 86 includes a resiliently compressible foam core 248 (e.g., polyurethane foam) encased within a pliable cover 250 (e.g., 22-once or 44-once vinyl coated fabric, nylon fabric, polyester fabric, non-fabric plastic sheeting, etc.). FIGS. 50-53 and 57 show the side support member 86 attached to the wall 18. In some examples, touch-and-hold fasteners 252 connect the side seal member 224 to the side support member 86.

In the example shown in FIGS. 50-57, the weather barrier apparatus 226 includes optional back sheet 74 for enclosing the header-receiving chamber 62. The back sheet 74 can be of any shape, size and material. Some example materials of the back sheet 74 include, but are not limited to, 22-once or 44-once vinyl coated fabric, nylon fabric, polyester fabric, non-fabric plastic sheeting, etc. The back sheet 74 can be attached and optionally supported by any suitable means. One example of such means includes, but is not limited to, a strap 254 (FIGS. 7 and 57) connecting the back sheet 74 to some convenient point 256 on the cover 250 and/or on the wall 18. In some examples, the strap 254 is omitted and portions of the back sheet 74 are left generally unsupported. In some examples, the back sheet 74 is supported by the header structure 151. In some examples the back sheet 74 is attached directly to the cover 250. In some examples, a portion of the cover 250 serves as part of the back sheet 74, whereby that portion of the cover 250 helps enclose the chamber 62.

Figure 58:
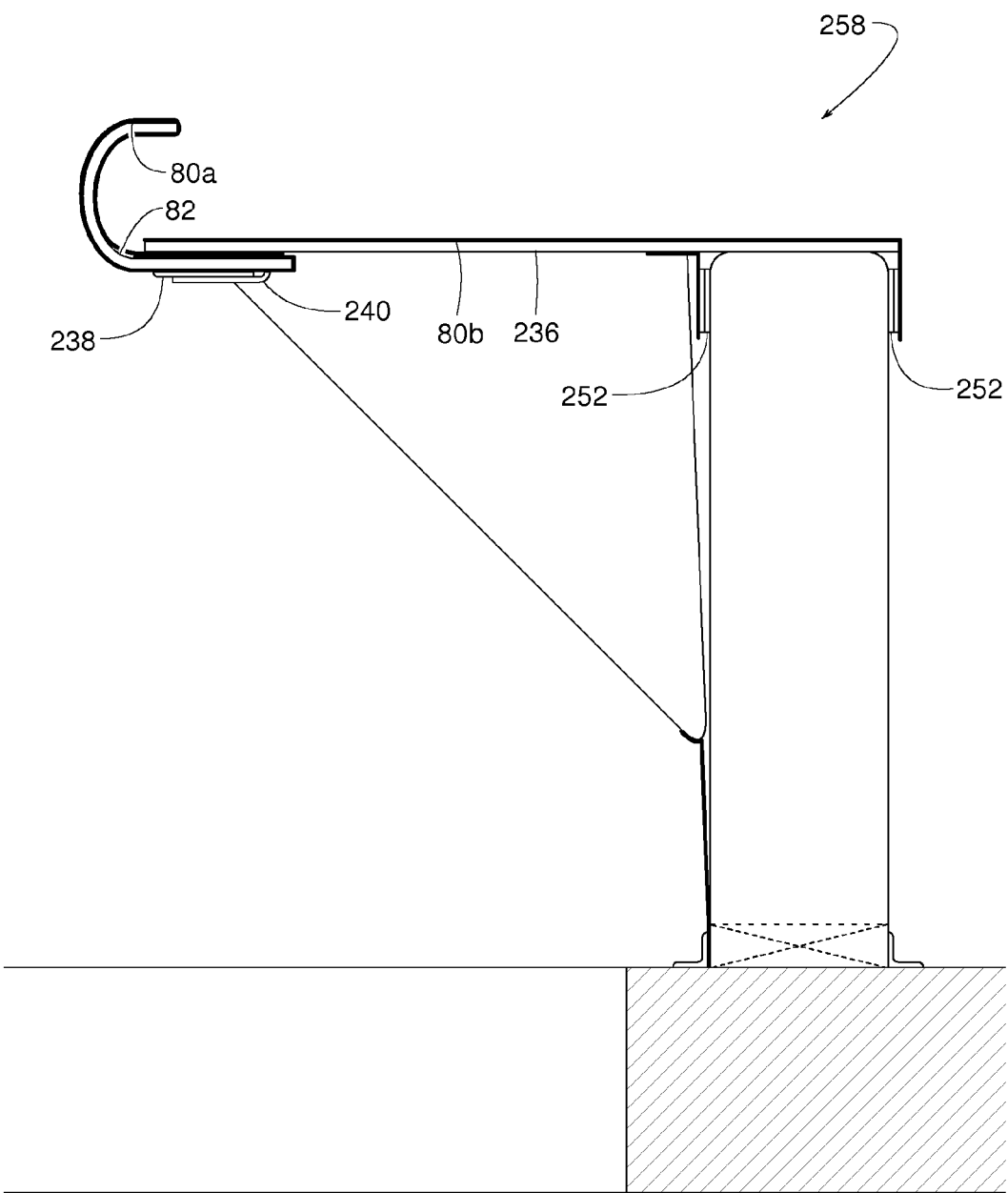
FIG. 58 is a cross-sectional view similar to FIG. 57 but showing another example of a side structure constructed in accordance with the teachings disclosed herein.

As an alternative to the cover 80 being a single sheet covering both the core 82 and the rest of the side seal member 224, FIG. 58 shows an example weather barrier apparatus 258 including a first cover 80*a* encasing the core 82 and a second cover 80*b* overlying the stays 236. Tabs 238 and strip 240 hold the core 82 and the first cover 80*a* to the stays 236 and the second cover 80*b*. This allows future replacement of the core 82 and the first cover 80*a* without having to replace the second cover 80*b*. Also, the second cover 80*b* can be replaced without having to replace the first cover 80*a*. In some examples, the weather barrier apparatus of FIG. 57 is retrofitted to create the weather barrier apparatus 258 of FIG. 58. In some examples, such a retrofit involves cutting the cover 80 to create the second cover 80*b* and adding a new first cover 80*a*.

Figure 59:
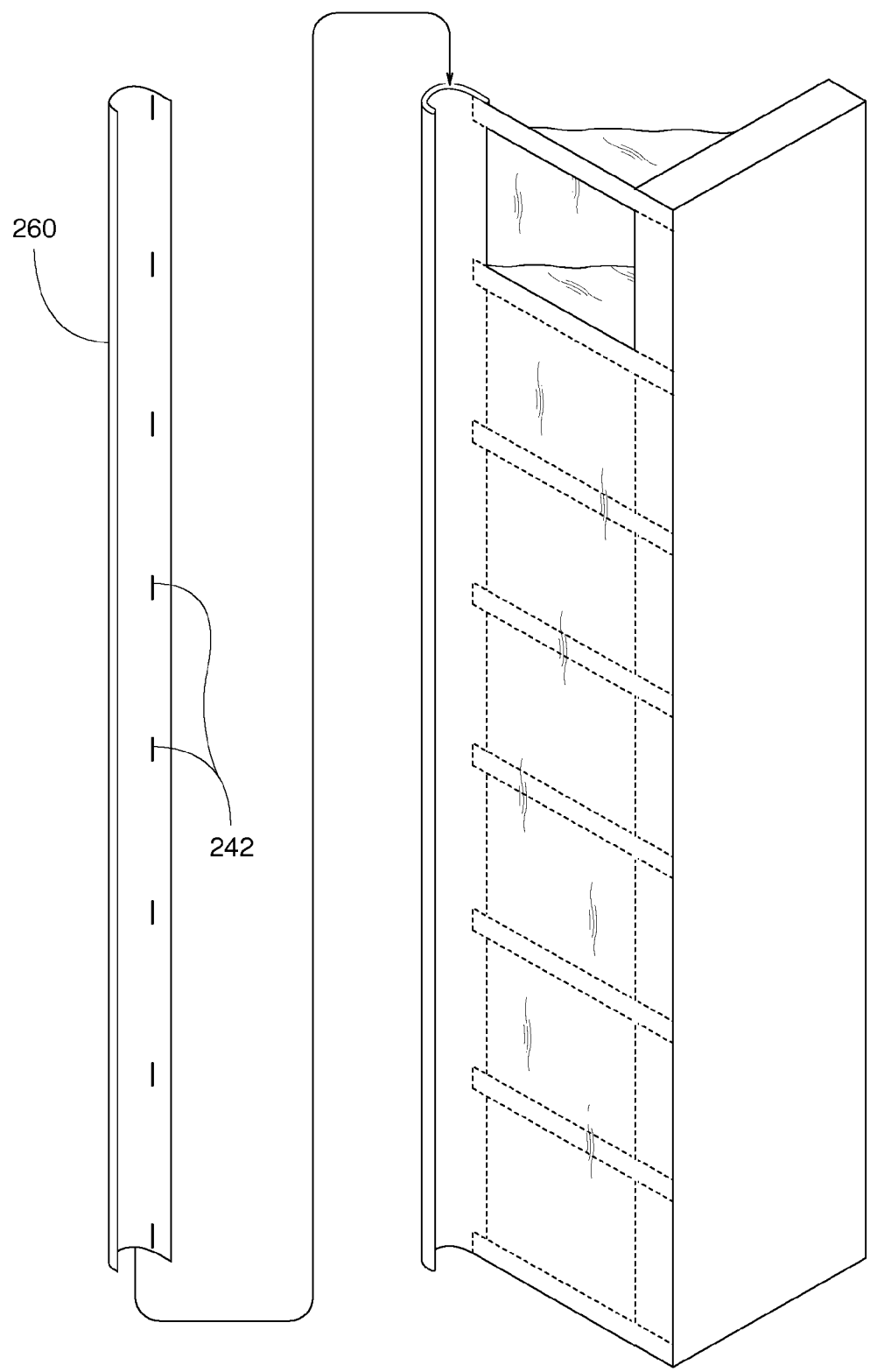
FIG. 59 is an exploded perspective view similar to FIG. 54 but showing an alternate example of a seal core constructed in accordance with the teachings disclosed herein.

FIGS. 59-62 show examples of alternate rear edge seal cores. FIG. 59 shows an example core 260 without the gap 84.

Figure 60:
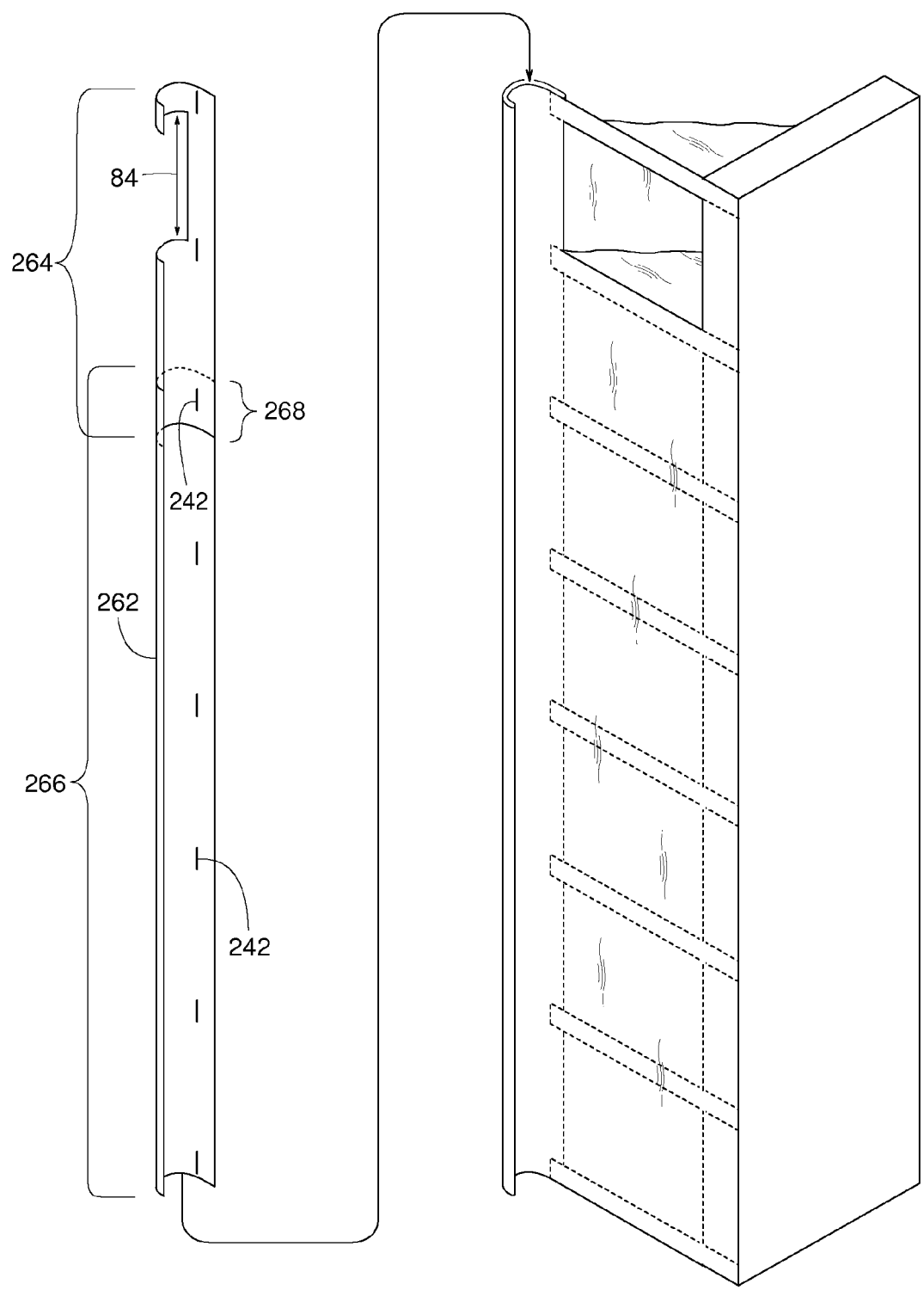
FIG. 60 is an exploded perspective view similar to FIG. 54 but showing another example of a seal core constructed in accordance with the teachings disclosed herein.

In some examples, instead of fabricating and stocking various length full height hook cores with an accompanying notch in both left and right hand versions, more economical hook cores include an assembly of upper and lower sections. The lower section, in some examples, is of a standard size and can be used in both left and right applications. The upper section, in some examples, includes the notch or gap 84 and is right/left hand specific. To minimize the number of different parts needed to be stocked, the upper and lower sections, in some examples, are overlapped to various degrees and joined to make various lengths. In some examples, both upper and lower ends of a hook core have a notch or gap that makes the hook core reversible for both left and right hand versions. FIG. 60, for example, shows a hook core 262 including an upper section 264 fitted to a lower section 266, with some overlap 268 where sections 264 and 266 come together. The upper section 264 includes a gap 84 while the lower section 266 can be cut to any desired length. As shown in the illustrated example of FIG. 60, corresponding slots 242 in each of the sections 264, 266 are aligned within the area of the overlap 268 to facilitate assembly of the example side structure.

Figure 61:
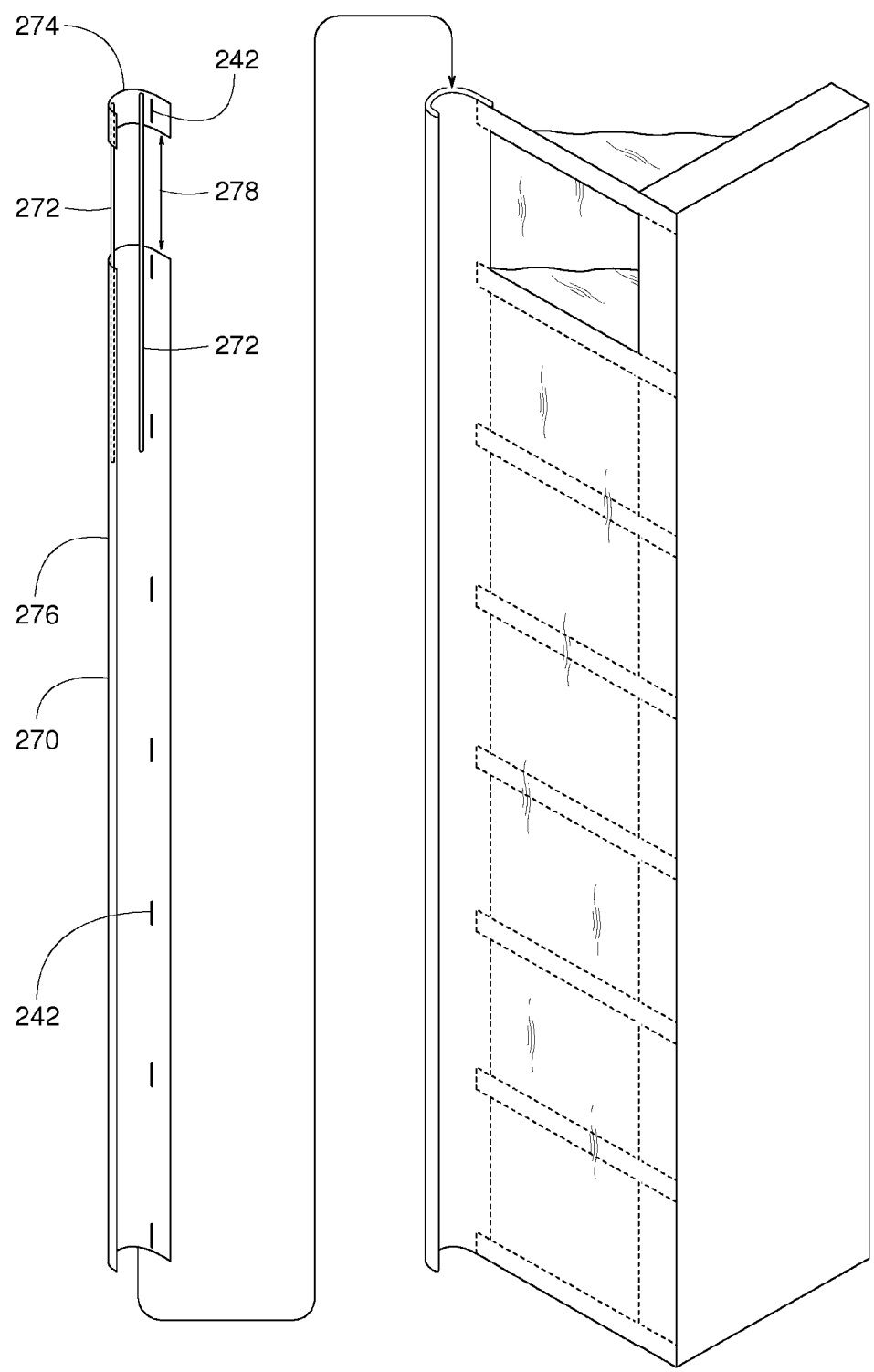
FIG. 61 is an exploded perspective view similar to FIG. 54 but showing another example of a seal core constructed in accordance with the teachings disclosed herein.

FIG. 61 shows an example core 270 including one or more connectors 272 that connect an upper section 274 to a lower section 276. The sections 274 and 276 are spaced apart to create a gap 278 between them. The connectors 272 can be of any suitable quantity (e.g., one, two or more), any suitable profile (e.g., round, flat, rectangular, tubular, channel, etc.) and any suitable material (e.g., fiberglass, steel, etc.). FIG. 62 shows an example core 280 including a plurality of hook pieces 282 interconnected by one or more connectors, such as connectors 284 and 286. The upper two hook pieces 282 are spaced apart to create a gap 288 between them. The connectors 284 and 286 can be of any suitable quantity (e.g., one, two or more), any suitable profile (e.g., round, flat, rectangular, tubular, channel, etc.) and any suitable material (e.g., fiberglass, steel, etc.). In some examples, the length of the gaps 278, 288 in FIGS. 61 and 62 are such that the slots 242 align with the tabs 238 described above in connection with FIGS. 54-58.

Figure 63:
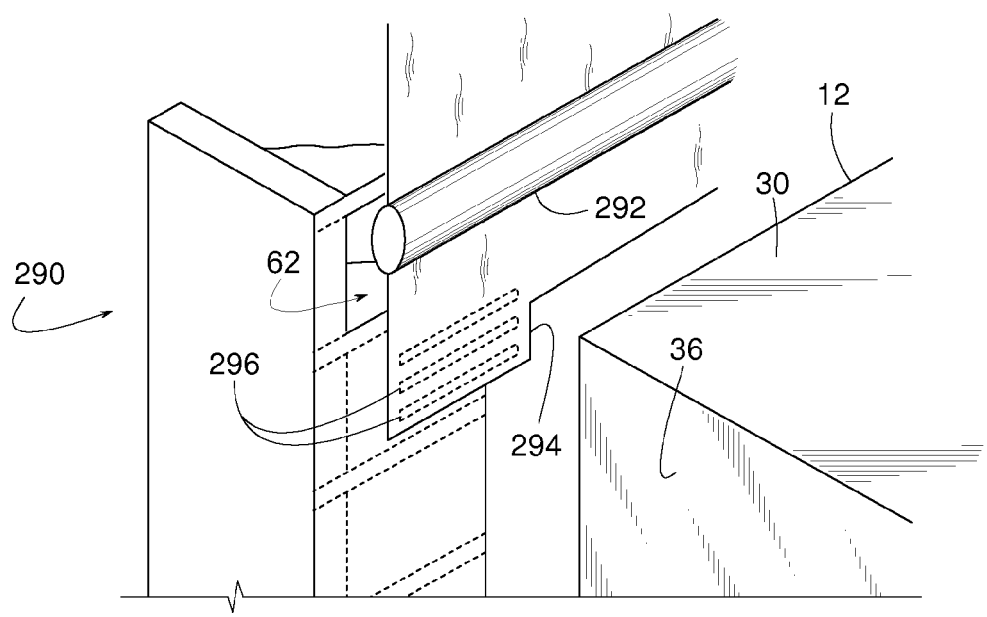
FIG. 63 is a perspective view similar to FIG. 22 but showing another example weather barrier apparatus with an example cover constructed in accordance with the teachings disclosed herein.

FIG. 63 shows an example weather barrier apparatus 290 having an example upper seal member 292 that includes a cover 294 with a series of stays or stiffeners 296 that help keep cover 294 stiff when seal member 292 is in the chamber 62 to cover the opening of the chamber.

Figure 64:
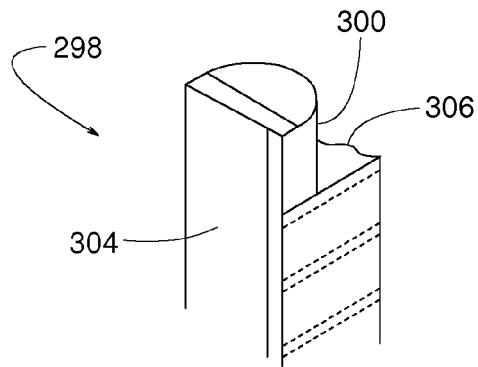
FIG. 64 is a perspective view similar to FIG. 14 but showing another example weather barrier apparatus with an example cover constructed in accordance with the teachings disclosed herein.
Figure 65:
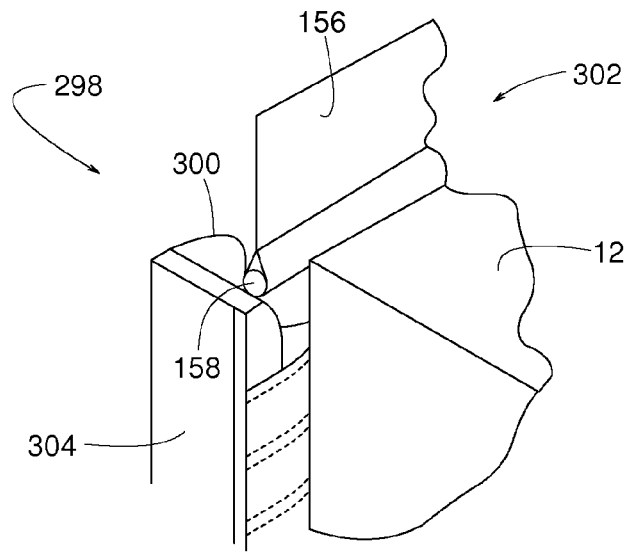
FIG. 65 is a perspective view of a vehicle backing into the example weather barrier apparatus shown in FIG. 64.
Figure 66:
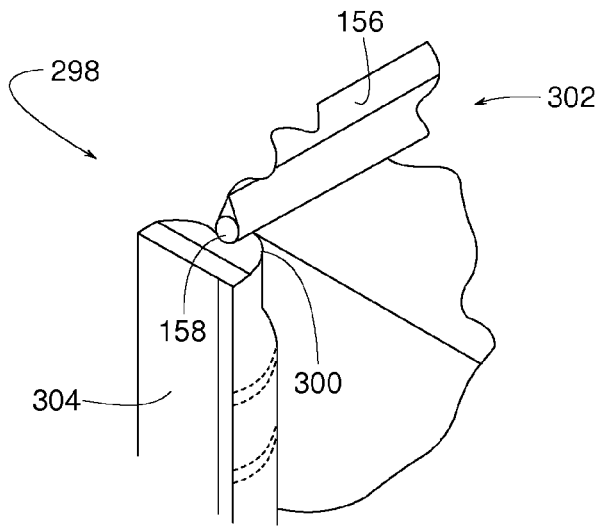
FIG. 66 is a perspective view of a vehicle backing farther into the example weather barrier apparatus shown in FIGS. 64 and 65.

FIGS. 64-66 show an example weather barrier apparatus 298 with an example upper seal member 302 including the sheet 156 and the cylinder 158. The weather barrier apparatus 298 also includes an example side structure 304 with a deformable cover 300. In some examples, when the cover 300 is engaged by the upper seal member 302, the cover 300 deforms locally and allows room for the upper seal member 302. Some examples of the cover 300 have upper and/or lower endcaps to enclose it. Some examples of the cover 300 do not have endcaps. Some examples of the cover 300 create somewhat of a "bubble" that in some examples is filled with foam. Some examples of the cover 300 are hollow and biased to resist movement. Some examples have an extra sealing flap 306 that helps seal from underneath. FIG. 65 shows the cover 300 moving out of the way as a lower portion of the upper seal member 302 (e.g., cylinder 158) penetrates the side structure 304. FIG. 66 shows the cover 300 having moved forward after the lower portion of the upper seal member 302 further penetrates the side structure 304. FIG. 66 also shows the cover 300 sealing sides of the vehicle 12 and underneath the upper seal member 302.

FIGS. 67-71 illustrate another example weather barrier apparatus 6700 disclosed herein. Those components of the example weather barrier apparatus 6700 that are substantially similar or identical to the components of the example weather barrier apparatus 10, 122, 132, 180, 190, 202, 216, 226, 258, 290, 298 described above in connection with of FIGS. 1-66 and that have functions substantially similar or identical to the functions of those components will not be described in detail again below. Instead, the interested reader is referred to the above corresponding descriptions. To facilitate this process, similar reference numbers will be used for like structures.

Figure 67:
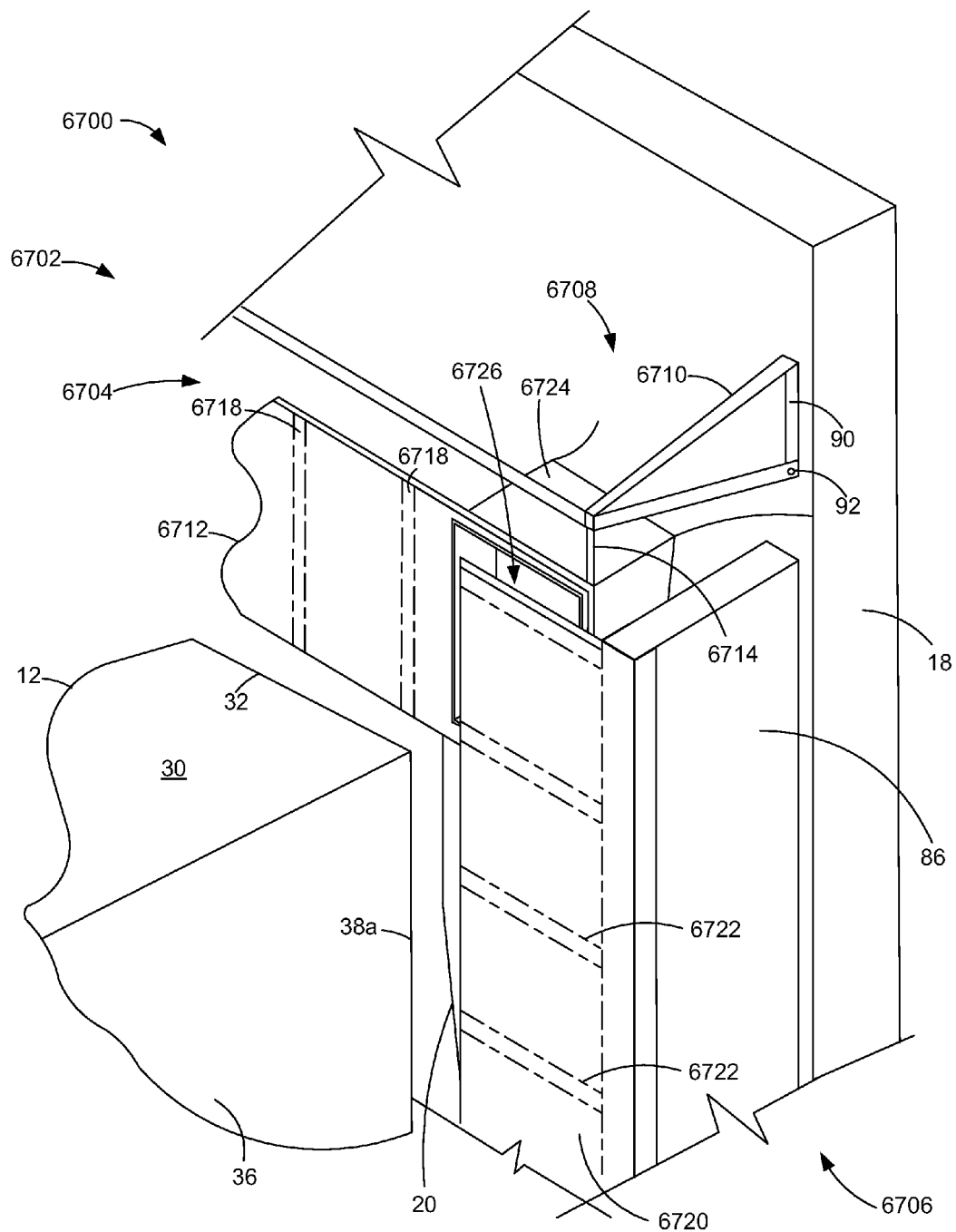
FIG. 67 is a partial perspective of another example weather barrier apparatus constructed in accordance with the teachings disclosed herein.

FIG. 67 is a partial, perspective view of the example weather barrier apparatus 6700 shown in a relaxed or non-deflected condition 6702 (e.g., prior to being engaged by a vehicle 12). Referring to FIG. 67, the weather barrier apparatus 6700 of the illustrated example includes a header structure 6704 (e.g., a generally horizontally elongate structure) proximate a first or top edge (e.g., a substantially horizontal edge parallel to the ground) of a doorway 20 and a side structure 6706 (e.g., a generally vertically elongate structure) proximate a second or side edge (e.g., a substantially vertical edge perpendicular to the ground) of the doorway 20. Only a first side 6708 (e.g., a right side or edge) of the header structure 6704 is shown in this example. However, a second side of the header structure 6704 opposite the first side 6708 is substantially similar or identical to the first side 6708. In addition, another side structure is positioned proximate the second side edge of the doorway 20 opposite the side structure 6706. The other side structure is not shown in this example, but is substantially identical to the side structure 6706. In some examples, the header structure 6704 is horizontally longer than a widest anticipated vehicle 12 and the side structure 6706 is taller than a highest anticipated vehicle 12.

The header structure 6704 of the illustrated example includes an upper support structure 6710 and an upper seal 6712 (e.g., a first seal or a second seal). The upper support structure 6710 of the illustrated example includes a frame 90 to attach the upper seal 6712 to a wall 18. In the illustrated example, the frame 90 is pivotal about a pin (e.g., the pin 92 of FIG. 3), which allows the frame 90 to tilt or deflect in an upward direction away from the vehicle 12 in reaction to an exceptionally high or tall vehicle backing into the weather barrier apparatus 6700. However, in some examples, the upper support structure 6710 is fixed (e.g., non-pivotal) relative to the wall 18. The upper seal 6712 is attached and/or suspended from the upper support structure 6710 via a mount or flexible member 6714 and is to engage and/or seal against a roof 30 and/or an upper rear edge 32 of the vehicle 12. In this example, the upper seal 6712 includes a plurality of stiffeners or stays 6718 (e.g., flexible stays 236) to help support and/or maintain a shape of the upper seal 6712 and/or provide upper seal 6712 with resilience. Further, the upper seal 6712 of the illustrated example may be formed and/or composed of a material substantially similar the upper seals 28, 126, 140, 144, 148, 152, 162, 168, 174, 198, 212, 312 of FIGS. 1-66.

The side structure 6706 of the illustrated example includes a side seal 6720 (e.g., a first seal or a second seal) attached to a side support frame 86, which mounts or attaches the side seal 6720 to the wall 18. The side seal 6720 is a flexible and/or resilient member such that at least a portion of the side seal 6720 can flex or bend relative to the side support frame 86 (e.g., when the side seal 6720 is engaged by the vehicle 12). When engaged with the vehicle 12, the side seal 6720 seals against a side panel 36 and/or against a vertical rear edge 38*a* of the vehicle 12. The side support frame 86 of the illustrated example is composed of a resiliently compressible polyurethane foam core encased within a pliable or flexible sheet of material. In this example, the side seal 6720 includes a plurality of stiffeners or stays 6722 (e.g., flexible stays 236) to help support and/or maintain a shape of the side seal 6720 and/or provide side seal 6720 with resilience. In some examples, the side seal 6720 may include a core 82 having a hook-style member similar to the example side seal 224 of FIGS. 55 and 56 and/or may configured similar to the example side seals of the example weather barrier apparatus 10, 122, 132, 180, 190, 202, 216, 226, 258, 290, 298 of FIGS. 1-66. Further, the side seal 6720 of the illustrated example may be formed and/or composed a material substantially similar the side seals 34a, 34b, 130, 142, 182, 192, 208, 218, and/or 224 of FIGS. 1-66.

Additionally, unlike the example weather barrier apparatus 10, 122, 132, 180, 190, 202, 216, 226, 258, 290, 298 of FIGS. 1-66, the header structure 6704 of the illustrated example includes a clearance feature 6724 to provide clearance at an interface 6726 between the header structure 6704 and the side structure 6706. Specifically, the interface 6726 of the illustrated example is provided at a portion or location where the side seal 6720 overlaps the upper seal 6712.

Figure 68:
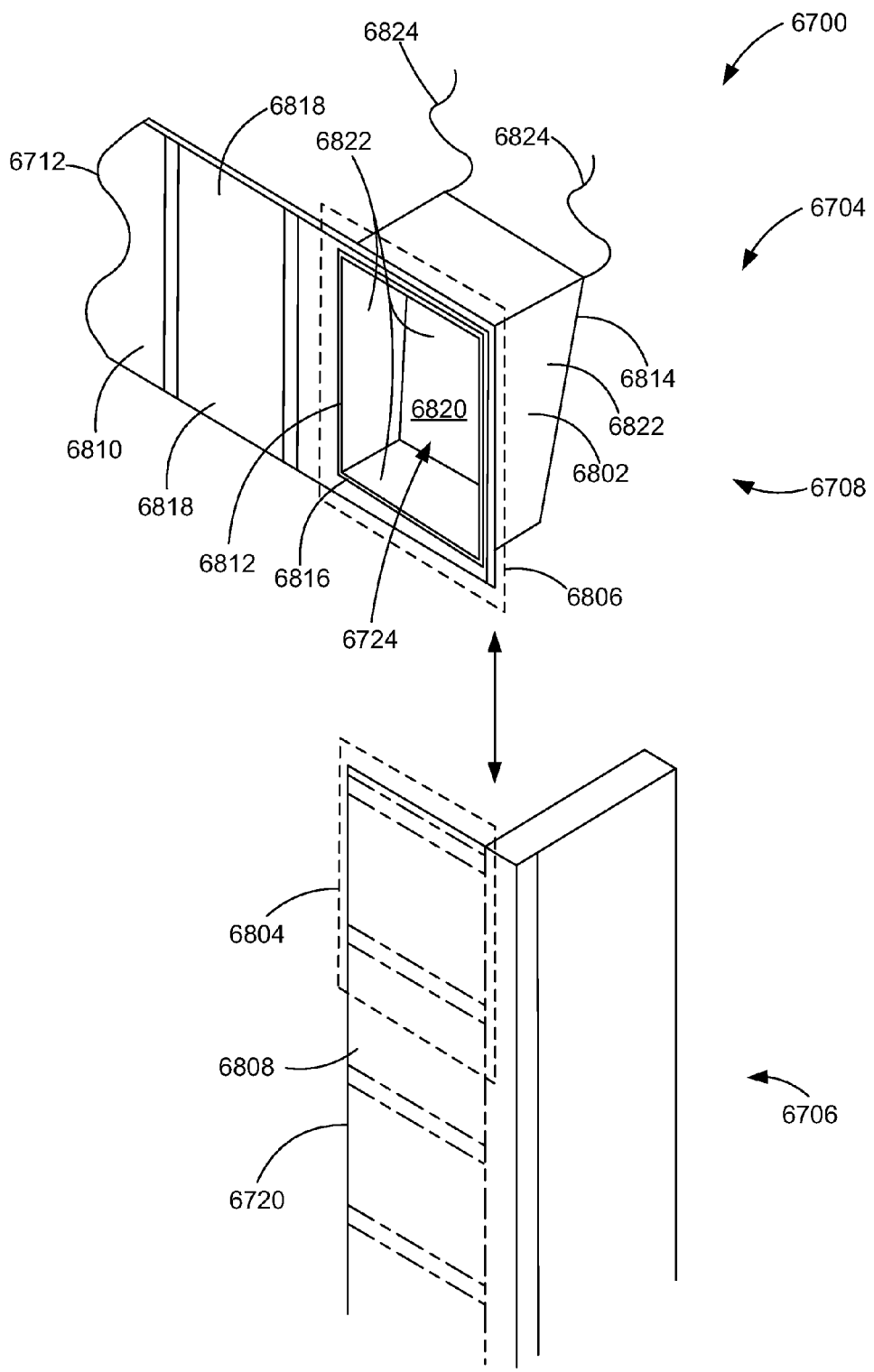
FIG. 68 is a partial, exploded view of the example weather barrier apparatus of FIG. 67.

FIG. 68 is a partial, exploded view of the example weather barrier apparatus 6700. The clearance feature 6724 of the illustrated example includes a side-seal structure receiving chamber or pocket 6802 formed, attached, and/or mounted to the header structure 6704 (FIG. 67). The pocket 6802 of the illustrated example is positioned adjacent the first side 6708 of the header structure 6704. Although not shown, the second side of the header structure 6704 and/or the upper seal 6712 opposite the first side 6708 also includes the pocket 6802. However, in some examples, the pocket 6802 is only positioned on the first side 6708 of the header structure 6704 and/or upper seal 6712. The side-seal receiving chamber or pocket 6802 of the illustrated example enables or allows the side structure 6706 to rotate, flex or bend towards the wall 18 (e.g., backwards) without interference from the upper seal 6712. To this end, unlike the weather barrier apparatus of FIGS. 1-66, at least a portion 6804 (e.g., a penetration portion) of the side structure 6706 and/or the side seal 6720 of the illustrated example overlaps at least a portion 6806 of the header structure 6704 and/or the upper seal 6712. In other words, at least a portion of the header structure 6704 and/or the upper seal 6712 is positioned behind a front face or vehicle-engaging portion 6808 of the side seal 6720 and/or the side structure 6706. Thus, in the illustrated example, the header structure 6704 is positioned between side seal 6720 and the wall 18.

The upper seal 6712 of the illustrated example includes a face panel or flexible curtain 6810. The face panel 6810 of the illustrated example includes an opening 6812 in communication with the pocket 6802. In the illustrated example, the pocket 6802 includes a frame 6814 positioned between the upper seal 6712 and/or the face panel 6810 and the wall 18. The frame 6814 may be composed of foam, fabric, one or more sheets, plastic, metal (e.g., sheet metal), stays or posts covered by fabric, and/or any other suitable material(s). The pocket 6802 and/or the frame 6814 can be any shape, examples of which include, but are not limited to, triangular, rectangular, partially spherical, partially cylindrical, irregular, and/or any other suitable shape.

The frame 6814 of the illustrated example includes a flange 6816 to engage a front surface or vehicle-engaging surface 6818 of the face panel 6810 to facilitate attachment and/or help secure the frame 6814 to the face panel 6810. The frame 6814 of the illustrated example defines a cavity 6820 in communication with the opening 6812. The cavity 6820 of the illustrated example is enclosed by walls 6822 to prevent air from flowing through the opening 6812 of the face panel 6810 and bypassing the header structure 6704 and/or the side member 6706. The pocket 6802 of the illustrated example includes one or more attachment members 6824 to attach and/or couple to the wall 18, the header structure 6704 and/or the side structure 6706. The attachment members 6824, in some examples, hold the pocket 6802 in position relative to the wall 18, the header structure 6704 and/or the side structure 6706 when the header structure 6704 is mounted to the wall 18 or at a loading dock. The attachment members 6824 of the illustrated example may include elastic cords, strings, Velcro, brackets, and/or any other fastener(s).

In some examples, the pocket 6802 is not enclosed and at least the portion 6804 of the side member 6720 penetrates through the header structure 6704 and/or the upper seal 6712 via the opening 6812 of the face panel 6810. In some examples, a cover may extend across (e.g., partially across) the opening 6812 to obstruct the opening. The cover may include, for example, the cover 110 of FIGS. 11 and 12, the cover 112 of FIGS. 14 and 15, the cover 114 of FIGS. 16 and 17, the cover 118 of FIGS. 18 and 19, the cover 120 of FIGS. 20 and 21, the cover 124 of FIGS. 22 and 23, the cover 134 of FIGS. 24 and 25, the cover 186 of FIGS. 40 and 41, the cover 200 of FIGS. 42 and 43, the cover 204 of FIGS. 44-46, the cover 294 of FIG. 63, the cover 300 of FIGS. 64-66, and/or any other cover to allow the side seal to extend into the pocket through the opening when the side seal is deflected by the vehicle 12.

Figure 69:
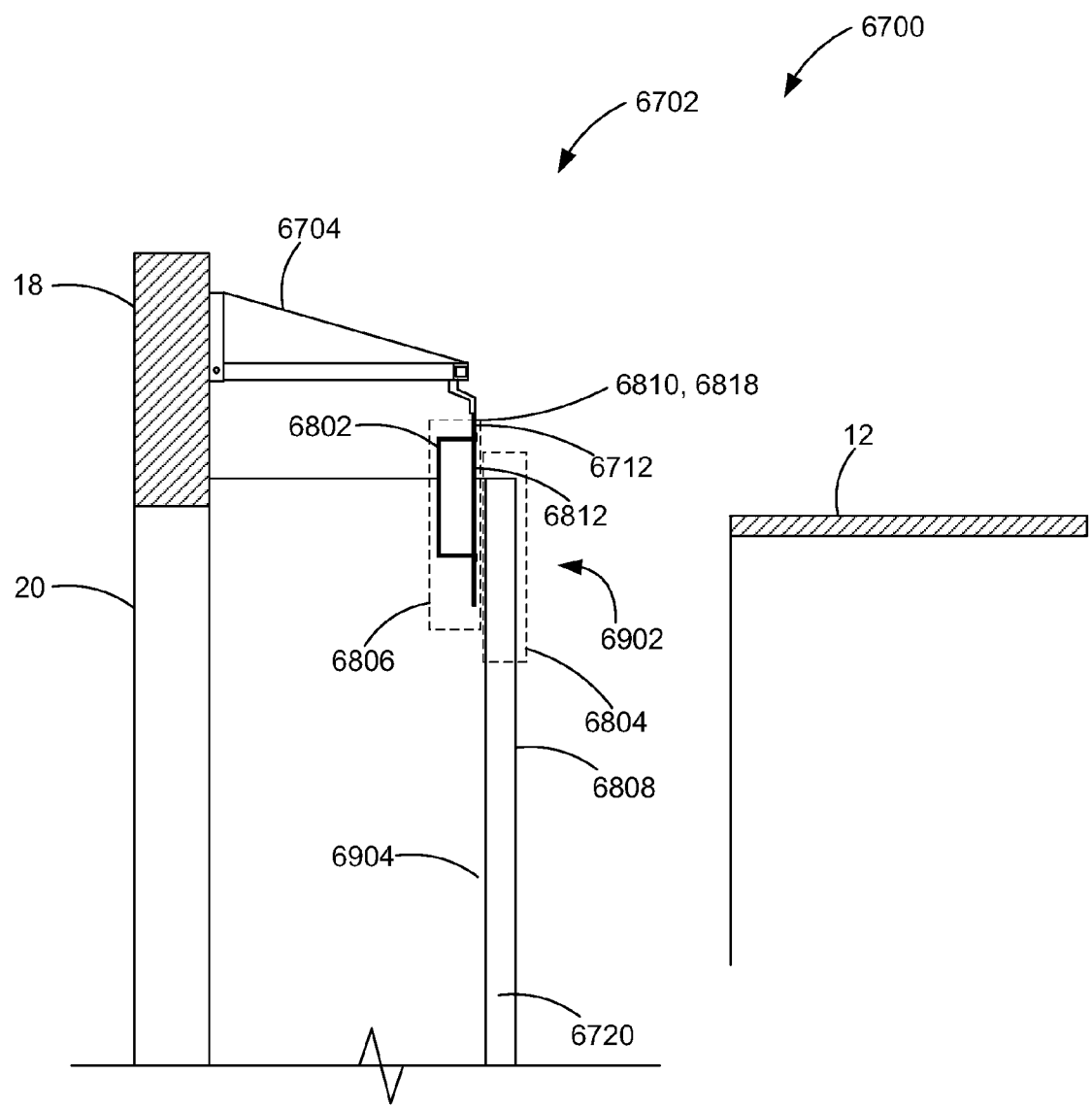
FIG. 69 is a side view of the example weather barrier apparatus of FIGS. 67 and 68.

FIG. 69 is a cross-sectional side view of the example weather barrier apparatus 6700 of FIGS. 67 and 68. In the examples shown in FIGS. 67-69, the example weather barrier apparatus 6700 is in the relaxed or non-engaged position 6702. In the relaxed position 6702, at least the portion 6804 of the side seal 6720 of the illustrated example overlaps and/or extends across at least the portion 6806 of the upper seal 6712 such that the side seal 6720 extends across and/or is positioned in front of the opening 6812 of the face panel 6810 when the header structure 6704 of the illustrated example is coupled to the side structure 6706. Thus, the side seal 6720 of the illustrated example covers or partial covers the opening 6812 of the face panel 6810 when the side seal 6720 is in a non-deflected position 6902 (e.g., when not in engagement with the vehicle 12). When the weather barrier apparatus 6700 is in the relaxed configuration 6702, the front surface or vehicle engaging surface 6808 of the side seal 6720 and/or the front surface or the vehicle engaging surface 6818 faces generally in a forward direction away from the doorway 20 and/or the wall 18. In the illustrated example, a rear surface 6904 (e.g., a first surface) of the side seal 6720 opposite the front surface 6808 (e.g., a second surface) is in contact or engagement with the front surface 6818 of the upper seal 6712 when the weather barrier apparatus 6700 is in the non-deflected condition 6702. However, in other examples, the rear surface 6904 of the side seal 6720 may be spaced away (e.g., disengaged) from the front surface 6818 of the upper seal 6712 when the weather barrier apparatus 6700 is in the non-deflected condition 6702.

Figure 70:
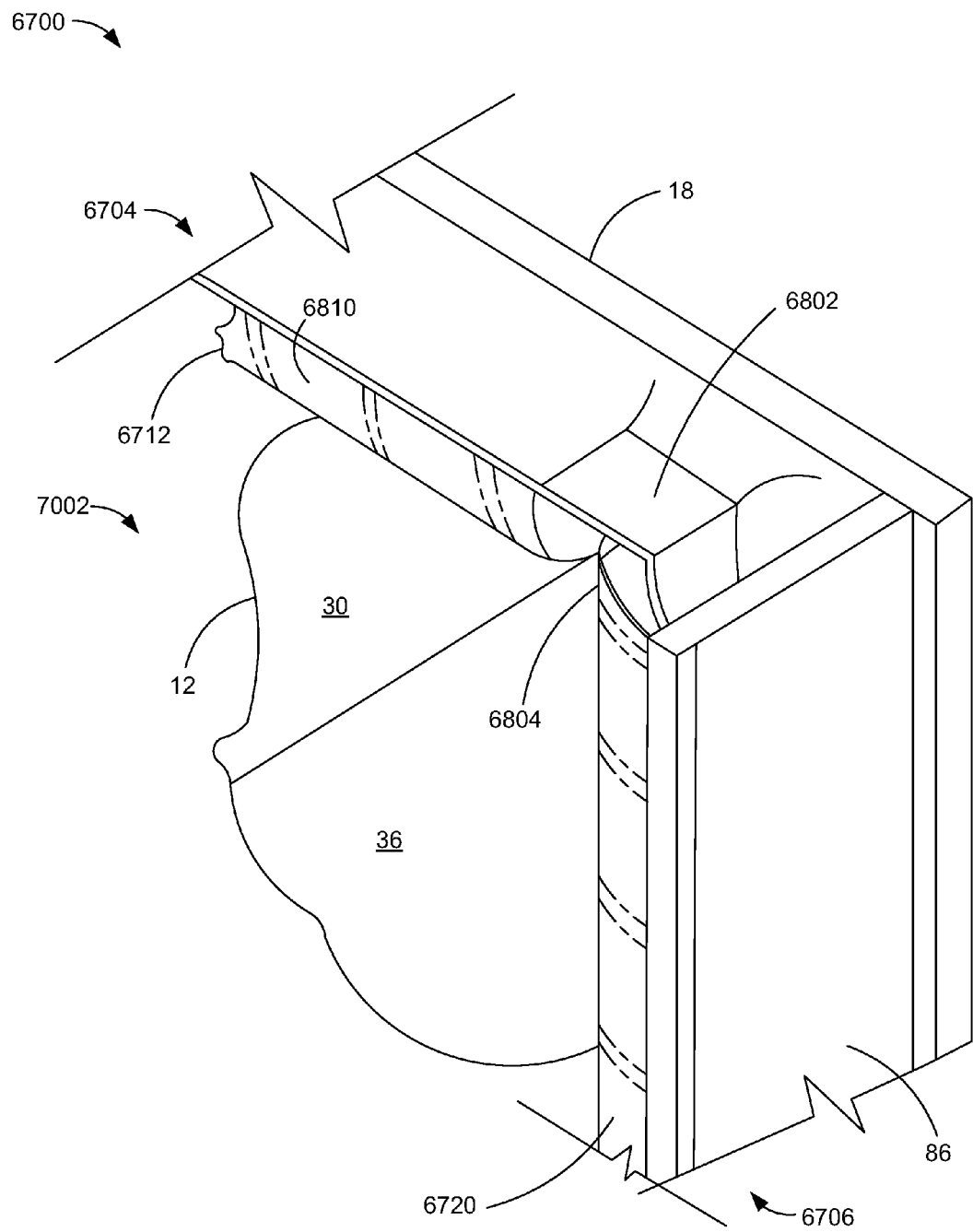
FIG. 70 is a partial, perspective view of the example weather barrier apparatus of FIGS. 67-69 shown in a deflected condition.

FIG. 70 is a partial, perspective view of the example weather barrier apparatus 6700 shown in a deflected or activated condition 7002 (e.g., being deflected and/or engaged by the vehicle 12). Referring to FIG. 70, as the vehicle 12 backs into and engages and/or deflects the header structure 6704, the vehicle causes the weather barrier apparatus 6700 to move from the relaxed condition 6702 to the activated condition 7002. In the activated condition 7002 as shown, for example, in FIG. 70, at least the portion (e.g., the portion 6804) of the side seal 6720 curves and/or bends toward the doorway 20 and/or the wall 18 to engage and/or seal against the side surface 36 and/or the vertical rear edge 38a of the vehicle 12.

Figure 71:
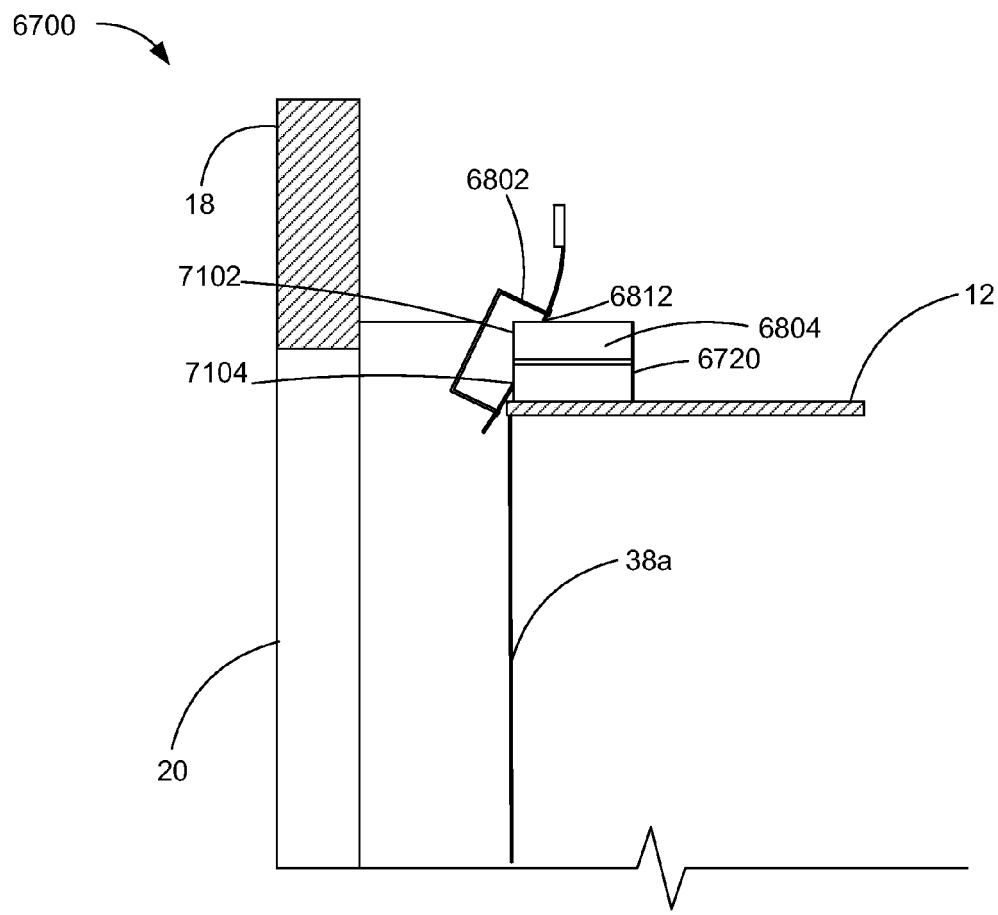
FIG. 71 is a side view of the example weather barrier apparatus of FIG. 69.

Likewise, the upper seal 6712 deflects and/or curves to engage and/or seal against the roof 30 and/or against the upper rear edge 32 of the vehicle 12 when the vehicle 12 engages the weather barrier apparatus 6700. FIG. 71 is a cross-sectional side view of the example weather barrier apparatus 6700 in the activated condition 7002 of FIG. 70. Referring to FIGS. 70 and 71, when the side seal 6720 of the illustrated example is deflected, the opening 6812 in the face panel 6810 allows, for example, the penetrating portion 6804 of the of the side seal 6720 to pass through or penetrate the front surface 6818, the face panel 6810 and/or the upper seal 6712 of the header structure 6704 rather than displace the face panel 6810 and/or the upper seal 6712 adversely (e.g., cause the face panel 6810 and/or the upper seal 6712 to move away from the rear upper edge 32 of the vehicle 12). As shown in FIG. 71, the side seal 6720 flexes or bends toward the wall 18 to cause at least the penetrating portion 6804 to flex or move in the pocket 6802 through the opening 6812 formed in the face panel 6810 when the side seal 6720 is deflected by the vehicle 12. More specifically, at least a corner portion 7102 (FIG. 71) of the side seal 6720 is deflected in the pocket 6802. The pocket 6802 and/or the frame 6814 of the illustrated example is compressible to facilitate the side seal 6720 to protrude into the opening 6812 and the pocket 6802 as the side seal 6720 deflects to place the front surface 6808 in sealing contact with the vehicle 12.

In some examples, the penetrating portion 6804 of the side seal 6720 includes, but is not limited to, a lateral edge 7104 of the side seal 6720, the corner portion 7102 (e.g., corner point) of the side seal 6720, etc. In some examples, the penetrating portion 6804 may be offset and/or detached from a remaining body portion of the side seal 6720 such that the penetrating portion 6804 may flex substantially independently from the remaining body portion of the side seal 6720. For example, the penetration portion 6804 may flex or move relative to the remaining body portion of the side seal 6720 via a slit, slot, cut and/or other detachment means (e.g., a horizontal slit extending between a first side edge of the side seal 6720 and a second side edge of the side seal 6720).

In some examples, the side seal 6720 of the illustrated example of FIGS. 67-71 may include a hook-shaped seal end such as, for example, the hook-shaped seals 82, 262, 270, 280, and/or another type of hook-shaped structure to engage the vertical side edge 38a of the vehicle 12. At least a portion of the hook-shaped structure portions may be received by the pocket 6802 when the side seal 6720 is deflected by the vehicle 12. Additionally or alternatively, the upper seal 6712 and/or the face panel 6810 may include a rear seal (e.g., a hook-style edge) such as, for example, the rear edge seal 68 and/or any other hook-style edge to engage the upper rear edge 32 of the vehicle 12.

In some examples, the example header structures of the example weather barrier apparatus 10, 122, 132, 180, 190, 202, 216, 226, 258, 290, 298 of FIGS. 1-66 may be configured with the opening 6812 and/or the pocket 6802 disclosed in FIGS. 67-71 instead of the respective pockets 62, the openings 64, 108, 136, 184, 196, 206, 220 and/or any other opening or cavity provided in the example side seal members 34a, 34b, 130, 142, 182, 192, 208, 218 and 224. In some such examples, at least portions of the side seal members 34a, 34b, 130, 142, 182, 192, 208, 218 and 224 and/or the upper sealing members 28, 126, 140, 144, 148, 152, 162, 166, 168, 174, 198, 212, and 302 of the example weather barrier apparatus 10, 122, 132, 180, 190, 202, 216, 226, 258, 290, 298 of FIGS. 1-66 may be received within the pocket 6802 and/or the opening 6812 of the example header structures. In some examples, the upper seal member 6712 may be, for example, the upper seal members 28, 126, 140, 144, 148, 152, 162, 166, 168, 174, 198, 212 and 302 that include, for example, a flexible curtain, cylinder, a weight, a seal, and/or any other seal that is suspended from the upper support member 6710.

Additionally or alternatively, the header structure 6704 may be, for example, the header structure 24, 146, 151. In some examples, the weather barrier apparatus 6700 may be implemented with a second upper seal member (e.g., the upper sealing members 28, 126, 140, 144, 148, 152, 162, 166, 168, 174, 198, 212, and 302) suspended from the upper support member 6710 and may hang in front of the upper seal 6712 and/or the side seal 6720 such that the second upper seal engages the roof 30 and/or the upper rear edge 32 of the vehicle 12. In some such examples, the upper seal 6712 and the second upper seal may be positioned between the wall 18 and the side seal 6720. Alternatively, the side seal 6720 may be positioned between the upper seal 6712 and the second upper seal. When in the deflected position, at least portions of the second upper seal and/or the side seal 6720 move in the pocket 6802. Alternatively, in some such examples having the upper seal 6712 and a second upper seal, the side seal 6720 may also include an opening (e.g., similar to the opening 64 of the side seal 34a). To this end, the opening (e.g., the opening 64) of the side seal 6720 receives a portion of the second upper seal (e.g., the flexible curtain of the upper seal 28) and the opening 6812 of the upper seal 6712 receives the penetrating portion 6804 of the side seal 6720 and/or at least portion of the second upper seal.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A weather barrier apparatus comprising:
a first seal to be engaged by a vehicle as the vehicle moves between a departed position and a parked position relative to the first seal, the first seal having a penetration portion movable between a relaxed condition when the vehicle releases the first seal and an activated condition when the vehicle engages the first seal; and
a second seal to be coupled adjacent the first seal, the second seal having an opening to be positioned adjacent the penetration portion of the first seal such that at least the penetration portion extends across at least a portion of the opening when the first seal is in the relaxed condition, and the opening of the second seal is to receive at least the penetration portion of the first seal when the first seal is in the activated condition, the second seal having a pocket positioned at an interface of the first seal and the second seal, the opening leading to a cavity defined by the pocket.

2. The weather barrier apparatus of claim 1, wherein the first seal is positioned adjacent a first edge of a doorway and the second seal is positioned adjacent a second edge of the doorway, wherein the first edge is non-parallel relative to the second edge.

3. The weather barrier apparatus of claim 2, further comprising a cover to extend across and obstruct the opening when the weather barrier apparatus is in the relaxed condition, the cover being movable within the opening when the penetration portion is deflected towards the opening.

4. The weather barrier apparatus of claim 1, wherein the first seal comprises a side seal and the second seal comprises a header.

5. The weather barrier apparatus of claim 4, wherein the header comprises the pocket.

6. The weather barrier apparatus of claim 1, wherein the first seal engages a vertical side edge of the vehicle and the second seal engages an upper rear edge of the vehicle when the weather barrier apparatus is in the activated condition.

7. The weather barrier apparatus of claim 1, wherein the second seal is to be positioned between the first seal and a wall of a loading dock.

8. The weather barrier apparatus of claim 1, wherein the first seal is to extend across at least a portion of the opening when the weather barrier apparatus is in the relaxed condition.

9. A weather barrier apparatus comprising:
- a header structure attachable to a wall proximate a doorway, the header structure to engage at least one of a roof or an upper rear edge of a vehicle when the weather barrier apparatus is to be engaged by the vehicle, the header structure defining a side seal member receiving chamber having a pocket positioned adjacent a first lateral edge of the header structure;
- a side support member attachable to the wall proximate the doorway; and
- a side seal member to extend from the side support member, the side seal member having a front surface facing away from the doorway when the side seal member is in non-deflected position when the vehicle is positioned away from the weather barrier apparatus, the side seal member extending at least partially across the side seal member receiving chamber, a portion of the side seal member to extend in the side seal member receiving chamber when the side seal member is deflected toward the doorway when the weather barrier apparatus is engaged by the vehicle.

10. The weather barrier apparatus of claim 9, wherein the header structure comprises a face panel, the face panel to face in a direction away from the doorway when the header structure is mounted to the wall, the face panel having an opening leading to the side seal member receiving chamber.

11. The weather barrier apparatus of claim 9, wherein the header structure is positioned between the side seal member and the wall to enable the side seal member to deflect within the side seal member receiving chamber.

12. The weather barrier apparatus of claim 9, wherein the side seal member receiving chamber is to receive a portion of the vehicle when the vehicle engages the side seal member and deflects the side seal member within the side seal member receiving chamber.

13. The weather barrier apparatus of claim 9, wherein the side seal member receiving chamber comprises a frame having walls that define the side seal member receiving chamber, the walls to prevent airflow through the side seal member receiving chamber.

14. A weather barrier apparatus comprising:
- a side support member attachable to a wall proximate a doorway;
- a side seal member to extend from the side support member and farther toward a center of the doorway when the weather barrier apparatus is in a non-deflected position than when the weather barrier apparatus is in a deflected position; and
- an upper seal attachable to the wall and positioned adjacent the side support member such that a first portion of the upper seal and a second portion of the side seal member overlap to define an interface, the upper seal having an opening in communication with a pocket adjacent the interface, the opening of the upper seal to receive at least a portion of the side seal member that penetrates the opening when the side seal member is in a deflected position.

15. The weather barrier apparatus of claim 14, wherein the pocket includes a frame having a wall member defining a cavity to receive the at least the portion of the side seal member.

16. The weather barrier apparatus of claim 14, wherein the upper seal is positioned between a wall of a loading dock and the side seal member.

17. The weather barrier apparatus of claim 14, wherein the side seal member includes a second opening, the side seal member being positioned between the wall and a second upper seal, the second opening to receive at least a portion of the second upper seal when the weather barrier apparatus is in the deflected position.

18. The weather barrier apparatus of claim 14, wherein the first portion of the side seal member is to extend across at least a portion of the opening when the weather barrier apparatus is in a non-deflected position.

* * * * *